US008838038B1

(12) United States Patent  (10) Patent No.: US 8,838,038 B1
Shirali et al.  (45) Date of Patent: *Sep. 16, 2014

(54) CLEAR-CHANNEL ASSESSMENT IN 40 MHZ WIRELESS RECEIVERS

(75) Inventors: Kedar Shirali, Sunnyvale, CA (US); Atul Salhotra, Sunnyvale, CA (US); Zhiyu Yang, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/613,996

(22) Filed: Sep. 13, 2012

Related U.S. Application Data

(63) Continuation of application No. 11/827,958, filed on Jul. 13, 2007, now Pat. No. 8,275,323.

(60) Provisional application No. 60/830,886, filed on Jul. 14, 2006.

(51) Int. Cl.
*H04B 17/00* (2006.01)
*H04W 72/04* (2009.01)

(52) U.S. Cl.
CPC .................................. *H04W 72/04* (2013.01)
USPC ....... 455/67.11; 455/509; 455/62; 455/67.13; 370/455; 370/229

(58) Field of Classification Search
USPC ...................... 455/67.11; 370/219, 229, 282, 370/310–350, 445, 503–521
See application file for complete search history.

(56) References Cited

U.S. PATENT DOCUMENTS

| | | | |
|---|---|---|---|
| 5,884,010 | A | 3/1999 | Chen et al. |
| 6,507,605 | B1 | 1/2003 | Fukumoto et al. |
| 7,212,798 | B1 * | 5/2007 | Adams et a ................. 455/251.1 |
| 7,295,599 | B1 * | 11/2007 | Karsi ............................ 375/219 |
| 7,403,539 | B1 * | 7/2008 | Tang et al. .................... 370/445 |

(Continued)

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Nay A Maung
*Assistant Examiner* — Erica Fleming-Hall

(57) ABSTRACT

A system including a plurality of filter modules to respectively communicate with a plurality of antennas, filter signals from channels other than a communication channel of a first wireless network, where the communication channel includes a first channel and a second channel, and generate a plurality of signals. A sensing module senses, based on the plurality of signals, whether radio frequency signals from a second network are present in at least one of the first channel and the second channel, and generates a plurality of control signals indicating presence or absence of the radio frequency signals in at least one of the first channel and the second channel. A channel identification module determines, based on the plurality of control signals, availability of the first channel and the second channel in response to whether the radio frequency signals are present in the first channel and the second channel.

20 Claims, 15 Drawing Sheets

(56) References Cited

U.S. PATENT DOCUMENTS

| | | | |
|---|---|---|---|
| 7,430,257 B1 | 9/2008 | Shattil | |
| 7,631,029 B2 | 12/2009 | Marsili | |
| 7,804,917 B2* | 9/2010 | French et al. | 375/316 |
| 7,821,976 B2 | 10/2010 | Kim et al. | |
| 7,924,930 B1 | 4/2011 | Salhotra et al. | |
| 8,369,469 B1 | 2/2013 | Salhotra et al. | |
| 8,369,657 B2* | 2/2013 | Chan et al. | 382/305 |
| 2003/0112911 A1 | 6/2003 | Barton et al. | |
| 2003/0123530 A1 | 7/2003 | Maeda et al. | |
| 2003/0236081 A1 | 12/2003 | Braun | |
| 2004/0019492 A1 | 1/2004 | Tucker et al. | |
| 2004/0116112 A1 | 6/2004 | Gray | |
| 2004/0120424 A1* | 6/2004 | Roberts | 375/327 |
| 2004/0218568 A1* | 11/2004 | Goodall et al. | 370/332 |
| 2004/0235439 A1* | 11/2004 | Husted et al. | 455/136 |
| 2005/0041693 A1 | 2/2005 | Priotti | |
| 2005/0079826 A1* | 4/2005 | He | 455/67.13 |
| 2005/0128985 A1 | 6/2005 | Liberti et al. | |
| 2005/0141630 A1 | 6/2005 | Catreux et al. | |
| 2005/0163264 A1 | 7/2005 | Nakao et al. | |
| 2005/0180314 A1* | 8/2005 | Webster et al. | 370/208 |
| 2005/0180353 A1* | 8/2005 | Hansen et al. | 370/328 |
| 2005/0185699 A1 | 8/2005 | Feher | |
| 2005/0265498 A1 | 12/2005 | Gunzelmann et al. | |
| 2006/0025178 A1 | 2/2006 | Tao et al. | |
| 2006/0062336 A1 | 3/2006 | Kang et al. | |
| 2006/0133462 A1 | 6/2006 | Nguyen et al. | |
| 2006/0146869 A1* | 7/2006 | Zhang et al. | 370/465 |
| 2006/0159003 A1* | 7/2006 | Nanda et al. | 370/203 |
| 2006/0166634 A1 | 7/2006 | Ido | |
| 2007/0041398 A1* | 2/2007 | Benveniste | 370/448 |
| 2007/0060155 A1* | 3/2007 | Kahana et al. | 455/450 |
| 2007/0091813 A1* | 4/2007 | Richard et al. | 370/248 |
| 2007/0104280 A1 | 5/2007 | Ibrahim et al. | |
| 2007/0117527 A1 | 5/2007 | Xu et al. | |
| 2007/0121705 A1* | 5/2007 | French et al. | 375/130 |
| 2007/0133473 A1* | 6/2007 | Takagi et al. | 370/334 |
| 2007/0153881 A1 | 7/2007 | Arslan | |
| 2007/0266157 A1* | 11/2007 | Xhafa et al. | 709/225 |
| 2007/0286122 A1* | 12/2007 | Fonseca | 370/329 |
| 2007/0298810 A1* | 12/2007 | Kasher et al. | 455/452.1 |
| 2008/0002643 A1* | 1/2008 | Octaviano et al. | 370/338 |
| 2008/0051040 A1* | 2/2008 | Shen et al. | 455/73 |
| 2008/0089222 A1* | 4/2008 | Kim et al. | 370/208 |
| 2008/0144596 A1 | 6/2008 | Dankberg et al. | |
| 2008/0151849 A1* | 6/2008 | Utsunomiya et al. | 370/338 |
| 2008/0162127 A1* | 7/2008 | Laaksonen et al. | 704/225 |
| 2010/0172427 A1 | 7/2010 | Kleider et al. | |
| 2012/0057492 A1* | 3/2012 | Goel et al. | 370/252 |
| 2012/0106665 A1 | 5/2012 | Nakao | |

OTHER PUBLICATIONS

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

IEEE Std 802.11h™-2003 (Amendment to IEEE Std 802.11™, 1999 Edition (Reaff 2003), as amended by IEEE Stds 802.11a™-1999, 802.11b™-1999, 802.11b™-1999/Cor 1-2001, 802.11d™-2001, and 802.11g™-2003); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; LAN/MAN Standards Committee of the IEEE Computer Society; Oct. 14, 2003; 74 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

Doc.: IEEE 802.11-04/0889r6; IEEE P802.11 Wireless LANs; TGn Sync Proposal Technical Specification; Agere Systems Inc., Syed Aon Mujtaba, 555 Union Blvd., Allentown, PA 18109, U.S.A.; May 18, 2005; 131 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirement—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

International Standard; ISO/IEC 8802-11; ANSI/IEEE Std 802.11 First edition 1999-00-00; Information technology—Telecommunications and information exchange between systems—Local and metropolitan area networks—Specific requirements—Part 11: Wireless LAN Medium Access Control (MAC) and Physical Layer (PHY) specifications; 531 pages.

IEEE Std 802.15.1™-2002; IEEE Standard for Information technology—Telecommunications and information exchange between systems—Local and metropolitan area networks—Specific requirements; Part 15.1: Wireless Medium Access Control (MAC) and Physical Layer (PHY) Specifications for Wireless Personal Area Networks (WPANs); IEEE Computer Society; Sponsored by the LAN/MAN Standards Committee; Jun. 14, 2002; 1169 pages.

U.S. Appl. No. 13/758,410, filed Feb. 4, 2013, Salhotra et al.

IEEE Std 802.11g/D2.8, May 2002 (Supplemental to ANSI/IEEE Std 802.11, 1999 Edition) Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Furhter Higher-Speed Physical Layer Extension in the 2.4 GHz Band; LAN/MAN Standards Committee of the IEEE Computer Society; 56 Pages.

* cited by examiner

CLEAR-CHANNEL ASSESSMENT IN 40 MHZ WIRELESS RECEIVERS

CROSS-REFERENCE TO RELATED APPLICATIONS

This application is a continuation of U.S. patent application Ser. No. 11/827,958, filed Jul. 13, 2007, which claims the benefit of U.S. Provisional Application No. 60/830,886, filed Jul. 14, 2006. The entire disclosures of the above applications are incorporated herein by reference.

FIELD

The present disclosure relates to communication systems, and more particularly to performing clear-channel assessment (CCA) in wireless receivers.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

I.E.E.E. sections 802.11, 802.11a, 802.11b, 802.11g, 802.11h, 802.11n, 802.15, 802.16, and 802.20 (collectively sections 802.11), which are incorporated herein by reference in their entirety, define ways for configuring wireless networks and devices. According to these standards, wireless network devices may operate in either an ad-hoc mode or an infrastructure mode.

Referring now to FIG. 1, in the ad-hoc mode, each client station 10-1, 10-2, . . . , and 10-N (collectively client stations 10) communicates directly with other client stations 10 without requiring an access point (AP). Referring now to FIG. 2, in the infrastructure mode, each client station 20-1, 20-2, . . . , and 20-M (collectively client stations 20) communicates with other client stations 20 through an AP 24. The AP 24 may provide a connection to a network 26, a server 28, and for the Internet 30.

Referring now to FIGS. 3A-3B, a wireless network device (hereinafter device) 50, such as the AP 24 and the client stations 10, 20, generally comprises at least one antenna 52, a physical layer (PHY) module 54, and a medium access controller (MAC) module 56. Additionally, the device 50 may include a processor 58 and other components. The PHY module 54 communicates with the medium (i.e., air) via the antenna 52. The MAC module 56 communicates with the PHY module 54 and the processor 58.

The PHY module 54 comprises a radio frequency (RF) transceiver module 55. The RF transceiver module 55 comprises a transmitter module 70 that transmits data and a receiver module 72 that receives data in the form of modulated RF carriers via the antenna 52. The transmitter module 70 may comprise an encoder module, a modulator module, an analog-to-digital converter (ADC) module, (all not shown) etc. The receiver module 72 may comprise an automatic gain control (AGC) module, a filter module, an ADC converter module, a demodulator module, a decoder module, (all not shown) etc.

Sections 802.11 provide that data may be transmitted via multiple channels in a predetermined frequency band. For example, section 802.11a provides eight channels in a 5 GHz frequency band, section 802.11b provides 14 channels in a 2.4 GHz frequency band, etc. Except for section 802.11n, the channels are 20 MHz wide (hereinafter 20 MHz channels). Adjacent channels in the frequency bands are 5 MHz apart. Data rates and throughput may be increased by simultaneously transmitting data via multiple channels. Overlap among the channels may be avoided if data is transmitted on channels that are at least 30 MHz apart. For example, devices that are compliant with section 802.11b may transmit data via channels 1, 6, and 11.

Although data may be simultaneously transmitted on multiple channels, the MAC module 56 is designed to share a single channel when two devices communicate. This may decrease the throughput as the number of devices that transmit data increases. According to section 802.11n, the throughput may be improved by using multiple antennas in the device 50. Specifically, multiple antennas may be arranged in a T×R multiple-input multiple-output (MIMO) configuration in the device 50, where T and R are integers greater than zero and denote number of transmit and receive antennas, respectively. Each antenna communicates with a RF transceiver that is dedicated to that antenna.

Section 802.11n provides that data may be transmitted via channels that are 40 MHz wide (hereinafter 40 MHz channels). Each 40 MHz channel comprises two 20 MHz channels. A first 20 MHz channel is called a primary channel or a control channel. A second 20 MHz channel is called a secondary channel or an extension channel.

Devices that comply with section 802.11n are compatible with devices that comply with sections 802.11a, 802.11b, 802.11g, etc. Specifically, devices that comply with section 802.11n communicate via the primary or control channel with devices that comply with sections 802.11a, 802.11b, 802.11g, etc.

A wireless network (hereinafter network) may include devices that comply with different 802.11 sections. For example, the network may comprise the AP 24 that complies with section 802.11n. Additionally, the network may comprise some client stations 20 that comply with section 802.11(n) and some client stations that comply with 802.11 sections other than section 802.11n.

The AP 24 may transmit data via a 40 MHz channel using the entire 40 MHz bandwidth of the 40 MHz channel when communicating with client stations 20 that are also 802.11n-compliant. Alternatively, the AP 24 may transmit data via the primary or control channel when communicating with client stations 20 that comply with 802.11 sections other than section 802.11n.

The PHY module 54 may transmit and receive data in packets. When transmitting data, the PHY module 54 may transmit a preamble having a predetermined periodicity in front of every packet. The preamble comprises repetitions of a sequence of known symbols. The predetermined periodicity of preamble sequences is the same whether data is transmitted via 40 MHz channels or 20 MHz channels. That is, preamble signals are substantially identical whether data is transmitted via 40 MHz channels or 20 MHz channels. The sequence of symbols may be used for synchronization by devices that receive the data. When the PHY module 54 receives data, the receiver module 72 performs a synchronization operation called symbol timing using the preamble signals before processing the data in the packet.

When multiple devices in the network simultaneously transmit data, collisions may occur. Data may get corrupted due to collisions. Corrupted data may be discarded when received. Data that is discarded may have to be retransmitted. Thus, collisions may decrease the quality of service (QoS) of the network.

To minimize collisions, devices in wireless networks utilize a carrier sense multiple access (CSMA) protocol to determine when a channel is free to transmit data. Ideally, only one device may transmit data via the channel at a given time. The devices "listen" for activity (i.e., presence or absence of RF carrier) in the channel before transmitting data via that channel. Listening for activity is generally referred to as carrier sensing (CS). Since multiple devices perform CS by simultaneously accessing the medium (i.e., air), the protocol is called carrier sense multiple access protocol.

Referring now to FIG. 4, the receiver module 72 comprises a channel sensing module 74 that senses whether a channel is busy or free when the device 50 listens. The channel sensing module 74 generates an estimate that indicates whether the channel is busy or free. The estimate is called clear-channel assessment (CCA). The channel sensing module 74 may generate CCA based on CS and/or energy detection (ED).

Accordingly, the channel sensing module 74 may comprise a carrier sensing module 76 and/or an energy sensing module 78. The carrier sensing module 76 senses whether a carrier is present or absent in the channel. The channel sensing module 74 generates CCA, which indicates whether the channel is busy or free depending on whether a carrier is present or absent in the channel, respectively.

Additionally or alternatively, the energy sensing module 78 may detect presence or absence of RF energy in the channel. In that case, the channel sensing module 74 generates CCA, which indicates whether the channel is busy or free depending on whether the energy sensing module 78 detects presence or absence of RF energy in the channel, respectively.

In either case, the PHY module 54 communicates the CCA to the MAC module 56. When the CCA indicates that the channel is busy, the MAC module 56 concludes that another device is transmitting data on the channel and decides that the device 50 may not transmit data on that channel. On the other hand, when the CCA indicates that the channel is free, the MAC module 56 concludes that no other device is transmitting data on the channel and decides that device 50 may transmit data on that channel.

Rate of collisions and quality of service in wireless networks depend on the accuracy with which the channel sensing module 74 generates CCA. The accuracy with which the channel sensing module 74 generates CCA, in turn, depends on the accuracy with which the carrier sensing module 76 can perform CS and/or the energy sensing module 78 can perform ED.

SUMMARY

A system comprises an activity sensing module and a channel identification module. The activity sensing module senses radio frequency (RF) activity in first and second sub-channels of a communication channel in a first wireless network and generates control signals based on the RF activity sensed in at least one of the first and second sub-channels. The channel identification module processes the control signals and determines that both of the first and second sub-channels are available for communication when the RF activity originating from a second wireless network is not present in both of the first and second sub-channels, wherein the second wireless network is different from the first wireless network. The channel identification module determines that the first sub-channel is available for communication when the RF activity originating from the second wireless network is present only in the second sub-channel and is less than or equal to a predetermined threshold.

In another feature, the channel identification module determines that the communication channel is available for communication when the channel identification module identifies that the RF activity is not present in both the first and second sub-channels. The communication channel is not available for communication when the channel identification module identifies that the RF activity is present in both the first and second sub-channels. The communication channel is not available for communication when the channel identification module identifies that the RF activity is present in the first sub-channel.

In another feature, the bandwidth of the communication channel is 40 MHz, the bandwidth of the first sub-channel is 20 MHz, and the bandwidth of the second sub-channel is 20 MHz.

In another feature, the activity sensing module comprises N adjacent channel interference (ACI) filter modules that communicate with N antennas, that receive signals from N antennas, that filter out signals in channels that are adjacent to the communication channel, and that generate N filtered signals, where N is an integer greater than 0.

In another feature, the activity sensing module comprises a first signal-selection module that communicates with the N ACI filter modules, that selects one of the N filtered signals having a signal-strength greater than the signal strengths of the other of the N filtered signals, and that generates a strongest filtered signal.

In another feature, the activity sensing module comprises (N+1) complex multiplier (CM) modules that communicate with the N ACI filter modules and the first signal-selection module. A first of the (N+1) CM modules shifts the strongest filtered signal in a first direction, filters out signals in the first channel, and generates a first control signal. A second of the (N+1) CM modules shifts the strongest filtered signal in a second direction, filters out signals in the second channel, and generates a second control signal, where the second direction is opposite of the first direction. (N−1) of the (N+1) CM modules other than the first and second of the (N+1) CM modules shift (N−1) of the N filtered signals other than the strongest filtered signal in the second direction and generate (N−1) shifted signals.

In another feature, the activity sensing module comprises (N+1) intra-channel filter modules that communicate with the (N+1) CM modules. A first of the (N+1) intra-channel filter modules filters the first control signal and generates a third control signal. A second of the (N+1) intra-channel filter modules filters the second control signal and generates a fourth control signal. (N−1) of the (N+1) intra-channel filter modules other than the first and second of the (N+1) intra-channel filter modules filter the (N−1) shifted signals and generate (N−1) filtered shifted signals.

In another feature, the channel identification module comprises a power sensing module that communicates with the activity sensing module, that senses differences in powers of the first, second, third, and fourth control signals, and that generates an initial clear channel assessment (CCA) based on the differences, wherein the initial CCA indicates whether at least one of the first and second channels is available for communication.

In another feature, the power sensing module senses a difference in powers of the first and third control signals and generates a first difference signal, senses a difference in powers of the second and fourth control signals and generates a second difference signal, and senses a difference in powers of the third and fourth control signals. The power sensing module generates an absolute value of the difference in powers of the third and fourth control signals, and generates a third difference signal.

In another feature, the initial CCA indicates that the RF activity is present in the second sub-channel when the difference in powers of the first and third control signals is low and that the RF activity is not present in the second sub-channel when the difference in powers of the first and third control signals is high. The initial CCA indicates that the RF activity is present in the first sub-channel when the difference in powers of the second and fourth control signals is low and that the RF activity is not present in the first sub-channel when the difference in powers of the second and fourth control signals is high. The initial CCA indicates that the RF activity is present in the first and second sub-channels when the absolute value is low and that the RF activity is not present in the first and second sub-channels when the absolute value is high.

In another feature, the activity sensing module comprises (N+1) correlator modules that communicate with the (N+1) intra-channel filter modules. A first of the (N+1) correlator modules auto-correlates the third control signal with a predetermined delay, wherein the predetermined delay is at least 0.8 µs, and generates a first correlation value for the second channel. N of the (N+1) correlator modules other than the first of the (N+1) correlator modules auto-correlate the fourth control signal and the (N−1) filtered shifted signals with the predetermined delay and generate N correlation values for the first sub-channel.

In another feature, the activity sensing module comprises a second signal selection module that communicates with the N of the (N+1) correlator modules other than the first of the (N+1) correlator modules and that selects a signal in the first sub-channel from the fourth control signal and the (N−1) filtered shifted signals, where a correlation value of the signal is the highest of the N correlation values.

In another feature, the activity sensing module comprises a first carrier detect (CD) module and a first symbol timing (ST) module that communicate with the first of the (N+1) correlator modules and further comprises a second CD module and a second ST module that communicate with the second signal selection module. The first CD module generates a first CD signal when the first CD module detects a RF carrier in the second sub-channel. The first ST module generates a first ST signal when the first CD module generates the first CD signal. The second CD module generates a second CD signal when the second CD module detects a RF carrier in the first sub-channel. The second ST module generates a second ST signal when the second CD module generates the second CD signal.

In another feature, the channel identification module comprises an energy detection module that communicates with the activity sensing module and the power sensing module, that detects whether RF energy is present in one of the first sub-channel, the second sub-channel, and both the first and second sub-channels, and that generates a final CCA based on the third and fourth control signals and the first, second, and third difference signals when the energy detection module receives one of the first and second ST signals.

In another feature, the energy detection module generates the final CCA that indicates that the RF energy is present in both the first and second sub-channels when at least one of the following is true. Magnitudes of the third and fourth control signals are greater than a first predetermined threshold. The magnitude of the first difference signal is less than a second predetermined threshold and magnitude of the second difference signal is less than a third predetermined threshold. The magnitude of the third difference signal is less than the third predetermined threshold.

In another feature, the energy detection module generates the final CCA that indicates that the RF energy is present in the second sub-channel and not present in the first sub-channel when magnitude of the first difference signal is less than the second-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, the energy detection module generates the final CCA that indicates that the RF energy is present in the first sub-channel and not present in the second sub-channel when magnitude of the second difference signal is less than the first-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, a wireless receiver module comprises the system, wherein the wireless receiver module communicates with a transmitter module that transmits data via the communication channel when the communication channel is available for communication and that transmits data via the first channel when the first channel is available for communication.

In another feature, a physical layer (PHY) module of a wireless network device that complies with I.E.E.E. section 802.11n, wherein the PHY module communicates with the N antennas, includes a transceiver module comprises the wireless receiver module, and wherein the transmitter module transmits data at 40 MHz via the communication channel when the communication channel is available for communication and at 20 MHz via the first sub-channel when the first sub-channel is available for communication.

In still other features, a method comprises sensing radio frequency (RF) activity in first and second sub-channels of a communication channel in a first wireless network, generating control signals based on the RF activity sensed in at least one of the first and second sub-channels, and processing the control signals. The method further comprises determining that both of the first and second sub-channels are available for communication when the RF activity originating from a second wireless network is not present in both of the first and second sub-channels, wherein the second wireless network is different from the first wireless network. The method further comprises determining that the first sub-channel is available for communication when the RF activity originating from the second wireless network is present only in the second sub-channel and is less than or equal to a predetermined threshold.

In another feature, the method further comprises determining that the communication channel is available for communication when the RF activity is not present in both the first and second sub-channels. The method further comprises determining that the communication channel is not available for communication when the RF activity is present in both the first and second sub-channels. The method further comprises determining that the communication channel is not available for communication when the RF activity is present in the first sub-channel.

In another feature, the bandwidth of the communication channel is 40 MHz, the bandwidth of the first sub-channel is 20 MHz, and the bandwidth of the second sub-channel is 20 MHz.

In another feature, the method further comprises receiving signals from N antennas, where N is an integer greater than 0, filtering out signals in channels that are adjacent to the communication channel, and generating N filtered signals.

In another feature, the method further comprises selecting one of the N filtered signals having a signal-strength greater than the signal strengths of the other of the N filtered signals and generating a strongest filtered signal.

In another feature, the method further comprises shifting the strongest filtered signal in a first direction, filtering out signals in the first channel, and generating a first control signal. The method further comprises shifting the strongest filtered signal in a second direction, where the second direction is opposite of the first direction, filtering out signals in the second channel, and generating a second control signal. The method further comprises shifting (N−1) of the N filtered signals other than the strongest filtered signal in the second direction and generating (N−1) shifted signals.

In another feature, the method further comprises filtering the first control signal, generating a third control signal, filtering the second control signal, and generating a fourth control signal. The method further comprises filtering the (N−1) shifted signals and generating (N−1) filtered shifted signals.

In another feature, the method further comprises sensing differences in powers of the first, second, third, and fourth control signals and generating an initial clear channel assessment (CCA) based on the differences, wherein the initial CCA indicates whether at least one of the first and second channels is available for communication.

In another feature, the method further comprises sensing a difference in powers of the first and third control signals and generating a first difference signal. The method further comprises sensing a difference in powers of the second and fourth control signals and generating a second difference signal. The method further comprises sensing a difference in powers of the third and fourth control signals, generating an absolute value of the difference in powers of the third and fourth control signals, and generating a third difference signal.

In another feature, the method further comprises indicating the following based on the initial CCA. The RF activity is present in the second sub-channel when the difference in powers of the first and third control signals is low. The RF activity is not present in the second sub-channel when the difference in powers of the first and third control signals is high. The RF activity is present in the first sub-channel when the difference in powers of the second and fourth control signals is low. The RF activity is not present in the first sub-channel when the difference in powers of the second and fourth control signals is high. The RF activity is present in the first and second sub-channels when the absolute value is low. The RF activity is not present in the first and second sub-channels when the absolute value is high.

In another feature, the method further comprises auto-correlating the third control signal with a predetermined delay, wherein the predetermined delay is at least 0.8 µs, and generating a first correlation value for the second channel. The method further comprises auto-correlating the fourth control signal and the (N−1) filtered shifted signals with the predetermined delay and generating N correlation values for the first sub-channel.

In another feature, the method further comprises selecting a signal in the first sub-channel from the fourth control signal and the (N−1) filtered shifted signals, where a correlation value of the signal is the highest of the N correlation values.

In another feature, the method further comprises generating a first CD signal when a RF carrier is detected in the second sub-channel and generating a first ST signal when the first CD signal is generated. The method further comprises generating a second CD signal when a RF carrier is detected in the first sub-channel and generating a second ST signal when the second CD signal is generated.

In another feature, the method further comprises receiving one of the first and second ST signals, detecting whether RF energy is present in one of the first sub-channel, the second sub-channel, and both the first and second sub-channels, and generating a final CCA based on the third and fourth control signals and the first, second, and third difference signals.

In another feature, the method further comprises generating the final CCA that indicates that the RF energy is present in both the first and second sub-channels when at least one of the following is true. Magnitudes of the third and fourth control signals are greater than a first predetermined threshold. The magnitude of the first difference signal is less than a second predetermined threshold and magnitude of the second difference signal is less than a third predetermined threshold. The magnitude of the third difference signal is less than the third predetermined threshold.

In another feature, the method further comprises generating the final CCA that indicates that the RF energy is present in the second sub-channel and not present in the first sub-channel when magnitude of the first difference signal is less than the second-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, the method further comprises generating the final CCA that indicates that the RF energy is present in the first sub-channel and not present in the second sub-channel when magnitude of the second difference signal is less than the first-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, the method further comprises transmitting data via the communication channel when the communication channel is available for communication and transmitting data via the first channel when the first channel is available for communication.

In still other features, a system comprises activity sensing means for sensing radio frequency (RF) activity in first and second sub-channels of a communication channel in a first wireless network and generating control signals based on the RF activity sensed in at least one of the first and second sub-channels. The system further comprises channel identification means for processing the control signals, that determines that both of the first and second sub-channels are available for communication when the RF activity originating from a second wireless network is not present in both of the first and second sub-channels, and that determines that the first sub-channel is available for communication when the RF activity originating from the second wireless network is present only in the second sub-channel and is less than or equal to a predetermined threshold, wherein the second wireless network is different from the first wireless network.

In another feature, the channel identification means determines that the communication channel is available for communication when the channel identification means identifies that the RF activity is not present in both the first and second sub-channels. The channel identification means determines that the communication channel is not available for communication when the channel identification means identifies that the RF activity is present in both the first and second sub-channels. The channel identification means determines that the communication channel is not available for communication when the channel identification means identifies that the RF activity is present in the first sub-channel.

In another feature, the bandwidth of the communication channel is 40 MHz, the bandwidth of the first sub-channel is 20 MHz, and the bandwidth of the second sub-channel is 20 MHz.

In another feature, the activity sensing means comprises N adjacent channel interference (ACI) filter means for filtering that communicate with N antennas, that receive signals from N antennas, that filter out signals in channels that are adjacent to the communication channel, and that generate N filtered signals, that where N is an integer greater than 0.

In another feature, the activity sensing means comprises first signal-selection means for selecting one of the N filtered signals having a signal-strength greater than the signal strengths of the other of the N filtered signals and generating a strongest filtered signal.

In another feature, the activity sensing means comprises (N+1) complex multiplier (CM) means for shifting signals that communicate with the N ACI filter means and the first signal-selection means. First of the (N+1) CM means shifts the strongest filtered signal in a first direction, filters out signals in the first channel, and generates a first control signal. Second of the (N+1) CM means shifts the strongest filtered signal in a second direction, filters out signals in the second channel, and generates a second control signal, where the second direction is opposite of the first direction. (N−1) of the (N+1) CM means other than the first and second of the (N+1) CM means shift (N−1) of the N filtered signals other than the strongest filtered signal in the second direction and generate (N−1) shifted signals.

In another feature, the activity sensing means comprises (N+1) intra-channel filter means for filtering that communicate with the (N+1) CM means. First of the (N+1) intra-channel filter means filters the first control signal and generates a third control signal. Second of the (N+1) intra-channel filter means filters the second control signal and generates a fourth control signal. (N−1) of the (N+1) intra-channel filter means other than the first and second of the (N+1) intra-channel filter means filter the (N−1) shifted signals and generate (N−1) filtered shifted signals.

In another feature, the channel identification means comprises power sensing means for sensing power that communicates with the activity sensing means, that senses differences in powers of the first, second, third, and fourth control signals, and that generates an initial clear channel assessment (CCA) based on the differences, wherein the initial CCA indicates whether at least one of the first and second channels is available for communication.

In another feature, the power sensing means senses a difference in powers of the first and third control signals and generates a first difference signal and senses a difference in powers of the second and fourth control signals and generates a second difference signal. The power sensing means senses a difference in powers of the third and fourth control signals, generates an absolute value of the difference in powers of the third and fourth control signals, and generates a third difference signal.

In another feature, the initial CCA indicates that the RF activity is present in the second sub-channel when the difference in powers of the first and third control signals is low. The initial CCA indicates that the RF activity is not present in the second sub-channel when the difference in powers of the first and third control signals is high. The initial CCA indicates that the RF activity is present in the first sub-channel when the difference in powers of the second and fourth control signals is low. The initial CCA indicates that the RF activity is not present in the first sub-channel when the difference in powers of the second and fourth control signals is high. The initial CCA indicates that the RF activity is present in the first and second sub-channels when the absolute value is low. The initial CCA indicates that the RF activity is not present in the first and second sub-channels when the absolute value is high.

In another feature, the activity sensing means comprises (N+1) correlator means that communicate with the (N+1) intra-channel filter means. First of the (N+1) correlator means auto-correlates the third control signal with a predetermined delay, wherein the predetermined delay is at least 0.8 μs, and generates a first correlation value for the second channel. N of the (N+1) correlator means other than the first of the (N+1) correlator means auto-correlate the fourth control signal and the (N−1) filtered shifted signals with the predetermined delay and generate N correlation values for the first sub-channel.

In another feature, the activity sensing means comprises second signal selection means for selecting a signal in the first sub-channel from the fourth control signal and the (N−1) filtered shifted signals, where a correlation value of the signal is the highest of the N correlation values and where the second signal selection means communicates with the N of the (N+1) correlator means other than the first of the (N+1) correlator means.

In another feature, the activity sensing means comprises first and second carrier detect (CD) means for detecting carriers and first and second symbol timing (ST) means for performing symbol timing, where the first CD and ST means communicate with the first of the (N+1) correlator means and where the second CD and ST means communicate with the second signal selection module. The first CD means generates a first CD signal when the first CD means detects a RF carrier in the second sub-channel. The first ST means generates a first ST signal when the first CD means generates the first CD signal. The second CD means generates a second CD signal when the second CD means detects a RF carrier in the first sub-channel. The second ST means generates a second ST signal when the second CD means generates the second CD signal.

In another feature, the channel identification means comprises energy detection means for detecting energy that communicates with the activity sensing means and the power sensing means, that detects whether RF energy is present in one of the first sub-channel, the second sub-channel, and both the first and second sub-channels, and that generates a final CCA based on the third and fourth control signals and the first, second, and third difference signals when the energy detection means receives one of the first and second ST signals.

In another feature, the energy detection means generates the final CCA that indicates that the RF energy is present in both the first and second sub-channels when at least one of the following is true. Magnitudes of the third and fourth control signals are greater than a first predetermined threshold. The magnitude of the first difference signal is less than a second predetermined threshold and magnitude of the second difference signal is less than a third predetermined threshold. The magnitude of the third difference signal is less than the third predetermined threshold.

In another feature, the energy detection means generates the final CCA that indicates that the RF energy is present in the second sub-channel and not present in the first sub-channel when magnitude of the first difference signal is less than the second-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, the energy detection means generates the final CCA that indicates that the RF energy is present in the first sub-channel and not present in the second sub-channel when magnitude of the second difference signal is less than the first-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, a wireless receiver comprises the system, wherein the wireless receiver communicates with a transmitter means for transmitting data via the communication channel when the communication channel is available for communication and via the first channel when the first channel is available for communication.

In another feature, a physical layer (PHY) of a wireless network device that complies with I.E.E.E. section 802.11n, wherein the PHY communicates with the N antennas, includes a transceiver comprises the wireless receiver, and wherein the transmitter means transmits data at 40 MHz via the communication channel when the communication channel is available for communication and at 20 MHz via the first sub-channel when the first sub-channel is available for communication.

In still other features, a computer program executed by a processor comprises sensing radio frequency (RF) activity in first and second sub-channels of a communication channel in a first wireless network, generating control signals based on the RF activity sensed in at least one of the first and second sub-channels, and processing the control signals. The computer program further comprises determining that both of the first and second sub-channels are available for communication when the RF activity originating from a second wireless network is not present in both of the first and second sub-channels, wherein the second wireless network is different from the first wireless network. The computer program further comprises determining that the first sub-channel is available for communication when the RF activity originating from the second wireless network is present only in the second sub-channel and is less than or equal to a predetermined threshold.

In another feature, the computer program further comprises determining that the communication channel is available for communication when the RF activity is not present in both the first and second sub-channels. The computer program further comprises determining that the communication channel is not available for communication when the RF activity is present in both the first and second sub-channels. The computer program further comprises determining that the communication channel is not available for communication when the RF activity is present in the first sub-channel.

In another feature, the bandwidth of the communication channel is 40 MHz, the bandwidth of the first sub-channel is 20 MHz, and the bandwidth of the second sub-channel is 20 MHz.

In another feature, the computer program further comprises receiving signals from N antennas, where N is an integer greater than 0, filtering out signals in channels that are adjacent to the communication channel, and generating N filtered signals.

In another feature, the computer program further comprises selecting one of the N filtered signals having a signal-strength greater than the signal strengths of the other of the N filtered signals and generating a strongest filtered signal.

In another feature, the computer program further comprises shifting the strongest filtered signal in a first direction, filtering out signals in the first channel, and generating a first control signal. The computer program further comprises shifting the strongest filtered signal in a second direction, where the second direction is opposite of the first direction, filtering out signals in the second channel, and generating a second control signal. The computer program further comprises shifting (N−1) of the N filtered signals other than the strongest filtered signal in the second direction and generating (N−1) shifted signals.

In another feature, the computer program further comprises filtering the first control signal and generating a third control signal. The computer program further comprises filtering the second control signal and generating a fourth control signal. The computer program further comprises filtering the (N−1) shifted signals and generating (N−1) filtered shifted signals.

In another feature, the computer program further comprises sensing differences in powers of the first, second, third, and fourth control signals and generating an initial clear channel assessment (CCA) based on the differences, wherein the initial CCA indicates whether at least one of the first and second channels is available for communication.

In another feature, the computer program further comprises sensing a difference in powers of the first and third control signals and generating a first difference signal. The computer program further comprises sensing a difference in powers of the second and fourth control signals and generating a second difference signal. The computer program further comprises sensing a difference in powers of the third and fourth control signals, generating an absolute value of the difference in powers of the third and fourth control signals, and generating a third difference signal.

In another feature, the computer program further comprises indicating based on the initial CCA the following. The RF activity is present in the second sub-channel when the difference in powers of the first and third control signals is low. The RF activity is not present in the second sub-channel when the difference in powers of the first and third control signals is high. The RF activity is present in the first sub-channel when the difference in powers of the second and fourth control signals is low. The RF activity is not present in the first sub-channel when the difference in powers of the second and fourth control signals is high. The RF activity is present in the first and second sub-channels when the absolute value is low. The RF activity is not present in the first and second sub-channels when the absolute value is high.

In another feature, the computer program further comprises auto-correlating the third control signal with a predetermined delay, wherein the predetermined delay is at least 0.8 μs, and generating a first correlation value for the second channel. The computer program further comprises auto-correlating the fourth control signal and the (N−1) filtered shifted signals with the predetermined delay and generating N correlation values for the first sub-channel.

In another feature, the computer program further comprises selecting a signal in the first sub-channel from the fourth control signal and the (N−1) filtered shifted signals, where a correlation value of the signal is the highest of the N correlation values.

In another feature, the computer program further comprises generating a first CD signal when a RF carrier is detected in the second sub-channel and generating a first ST signal when the first CD signal is generated. The computer program further comprises generates a second CD signal when a RF carrier is detected in the first sub-channel and generating a second ST signal when the second CD signal is generated.

In another feature, the computer program further comprises receiving one of the first and second ST signals, detecting whether RF energy is present in one of the first sub-channel, the second sub-channel, and both the first and second sub-channels, and generating a final CCA based on the third and fourth control signals and the first, second, and third difference signals.

In another feature, the computer program further comprises generating the final CCA that indicates that the RF energy is present in both the first and second sub-channels when at least one of the following is true. Magnitudes of the third and fourth control signals are greater than a first predetermined threshold. The magnitude of the first difference signal is less than a second predetermined threshold and magnitude of the second difference signal is less than a third predetermined threshold. The magnitude of the third difference signal is less than the third predetermined threshold.

In another feature, the computer program further comprises generating the final CCA that indicates that the RF energy is present in the second sub-channel and not present in the first sub-channel when magnitude of the first difference signal is less than the second-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, the computer program further comprises generating the final CCA that indicates that the RF energy is present in the first sub-channel and not present in the second sub-channel when magnitude of the second difference signal is less than the first-channel threshold and when each of the following is false. Magnitudes of the third and fourth control signals are greater than the first predetermined threshold. The magnitude of the first difference signal is less than the second predetermined threshold and magnitude of the second difference signal is less than the third predetermined threshold. The magnitude of the third difference signal is less than the third predetermined threshold.

In another feature, the computer program further comprises transmitting data via the communication channel when the communication channel is available for communication and transmitting data via the first channel when the first channel is available for communication.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
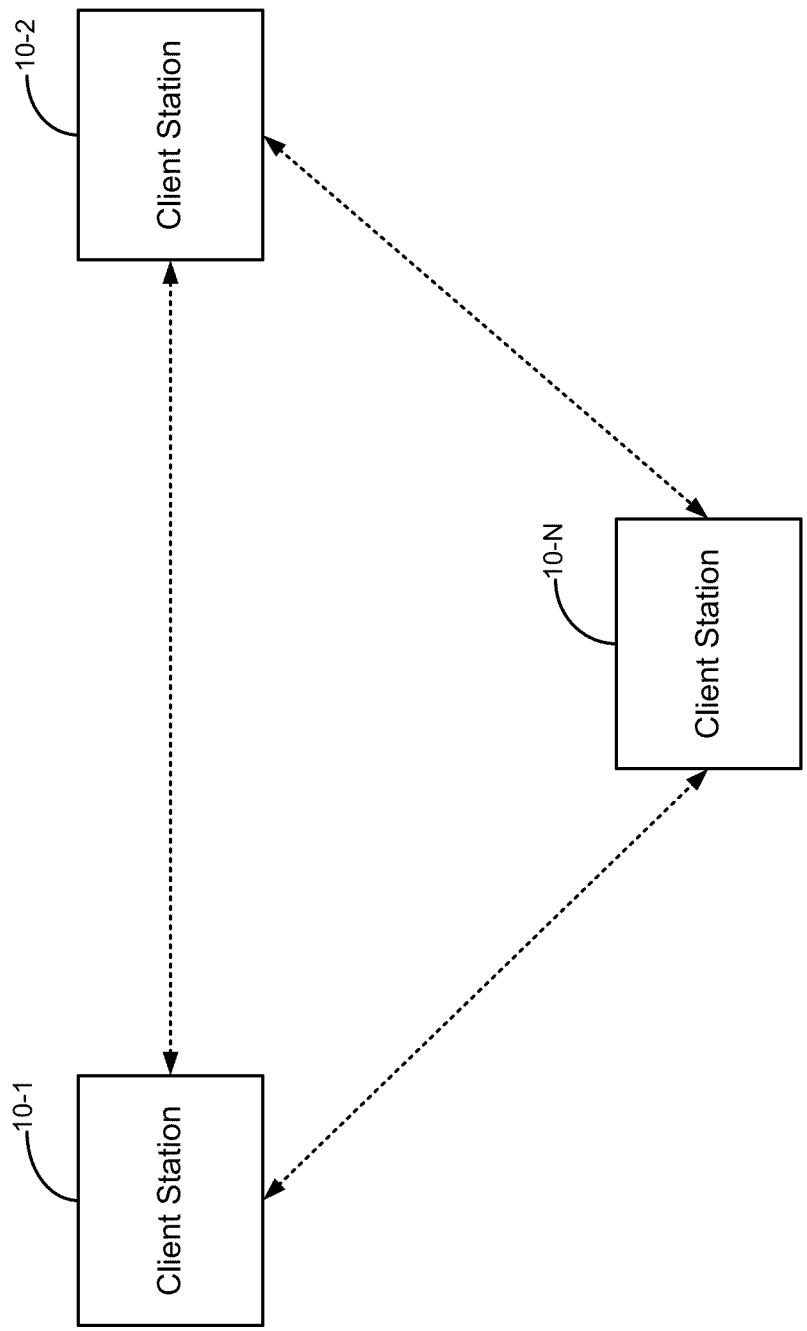
FIG. 1 is a functional block diagram of an exemplary wireless network operating in ad-hoc mode according to the prior art.
Figure 2:
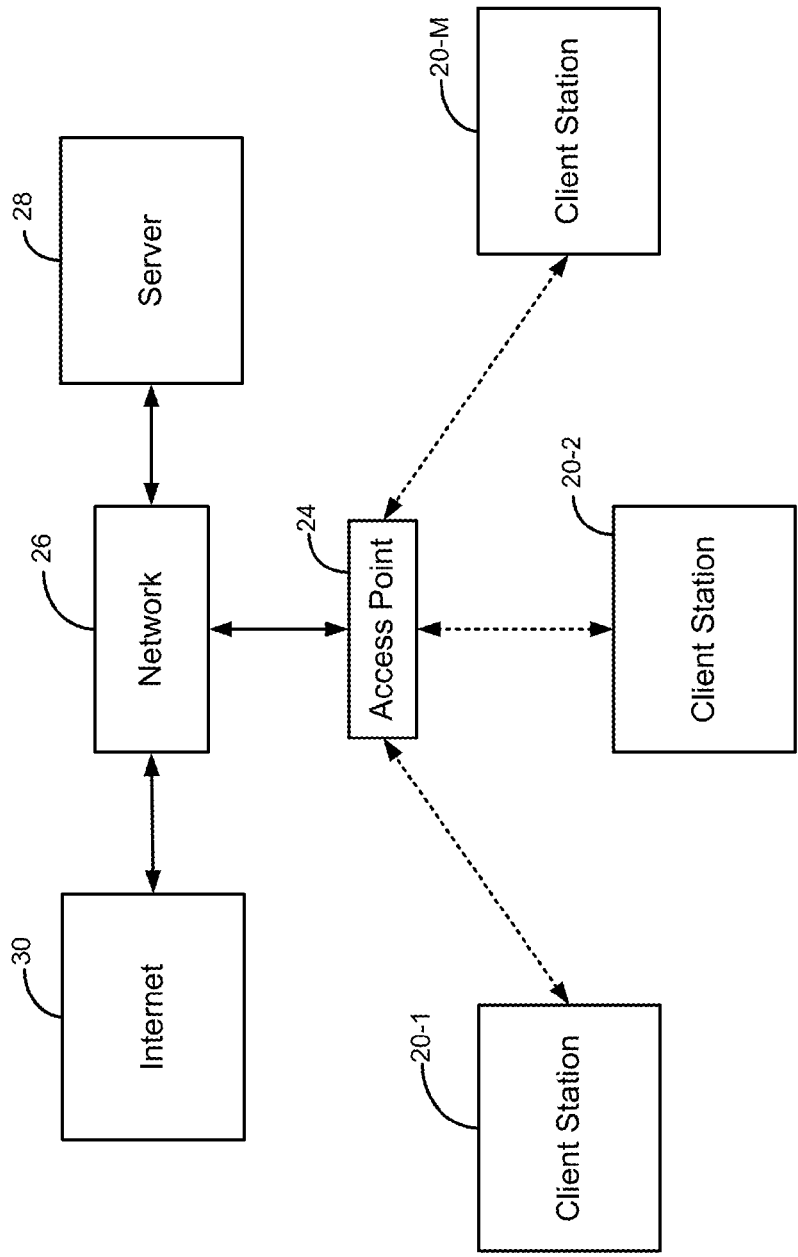
FIG. 2 is a functional block diagram of an exemplary wireless network operating in infrastructure mode according to the prior art.
Figure 3A:
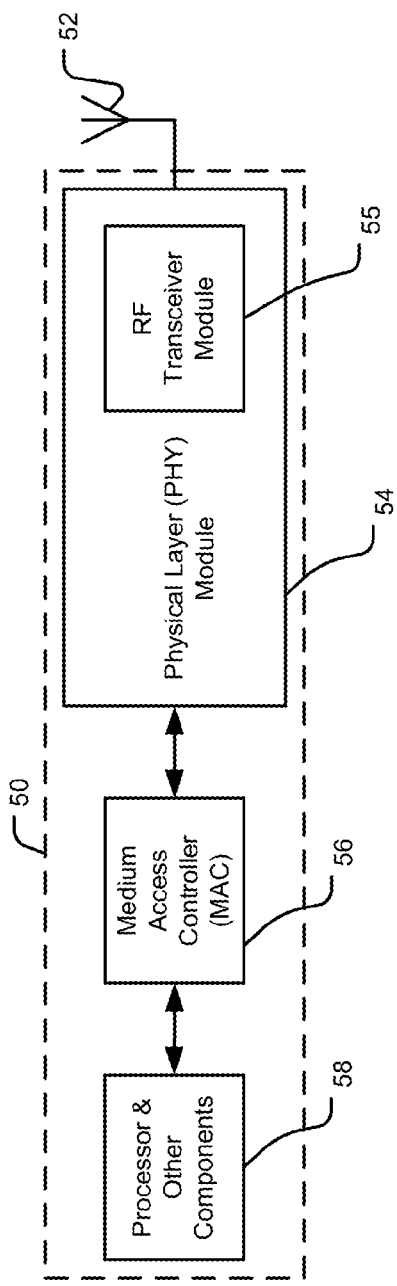
FIG. 3A is a functional block diagram of an exemplary wireless network device according to the prior art.
Figure 3B:
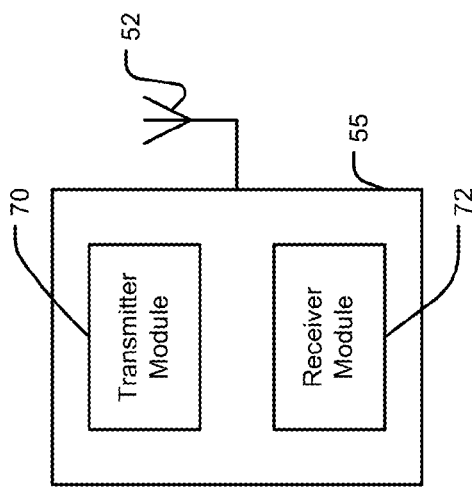
FIG. 3B is a functional block diagram of a transceiver in a wireless network device according to the prior art.
Figure 4:
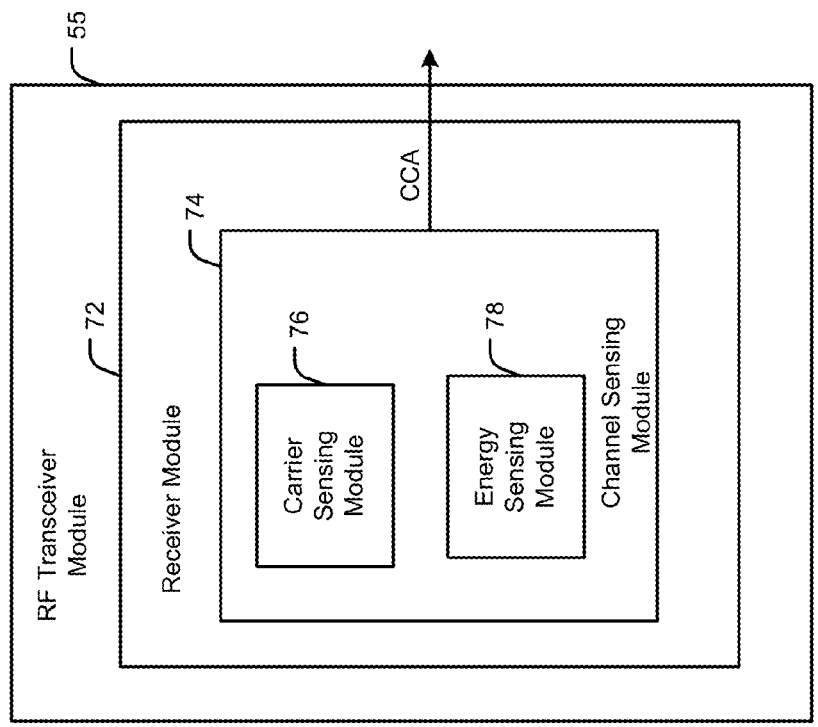
FIG. 4 is a functional block diagram of a receiver in a wireless network device according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Wireless network devices (devices) that comply with I.E.E.E. section 802.11n generate a clear-channel assessment (CCA) of a 40 MHz channel before transmitting data via the 40 MHz channel. The devices may be referred to as 40 MHz devices and may generate CCA by performing a carrier sensing (CS) operation. During CS, the 40 MHz devices detect presence or absence of radio frequency (RF) activity in the 40 MHz bandwidth of the 40 MHz channel.

In a wireless network, the 40 MHz devices may communicate with other devices that comply with I.E.E.E sections 802.11a, 802.11b, and/or 802.11g instead of I.E.E.E. section 802.11n and that transmit data via a 20 MHz channel. Additionally, the 40 MHz devices may communicate with devices that comply with I.E.E.E. 802.11n but that communicate at 20 MHz. The 20 MHz channel may be adjacent to or overlap with one of two 20 MHz portions of the 40 MHz channel: a control channel and an extension channel. Hereinafter, the control channel may also be called a primary channel or a first channel, and the extension channel may also be called a secondary channel or a second channel.

Typically, the devices transmit data packets preceded by preamble signals. Preamble signals transmitted in a 40 MHz channel have substantially the same periodicity as the periodicity of preamble signals transmitted in a 20 MHz channel. Consequently, a device compliant with section 802.11n (hereinafter device1) performing CS may detect preamble signals in either the control or the extension channel when data is transmitted by a device that complies with I.E.E.E. sections 802.11a, 802.11b, and/or 802.11g instead of section 802.11n (hereinafter device2).

When device 1 performs CS in the 40 Mhz channel, device1 may generate a CCA, which may indicate that the 40 MHz channel is busy although only the extension channel may be busy and the control channel may be free. Consequently, device1 may erroneously decide not to transmit data at all although device1 can transmit data via the control channel to device2 if the control channel is free. device1 can transmit data to device2 although device1 senses activity in the extension channel if device1 can distinguish activity sensed in the extension channel from activity sensed in the control channel.

Figure 5:
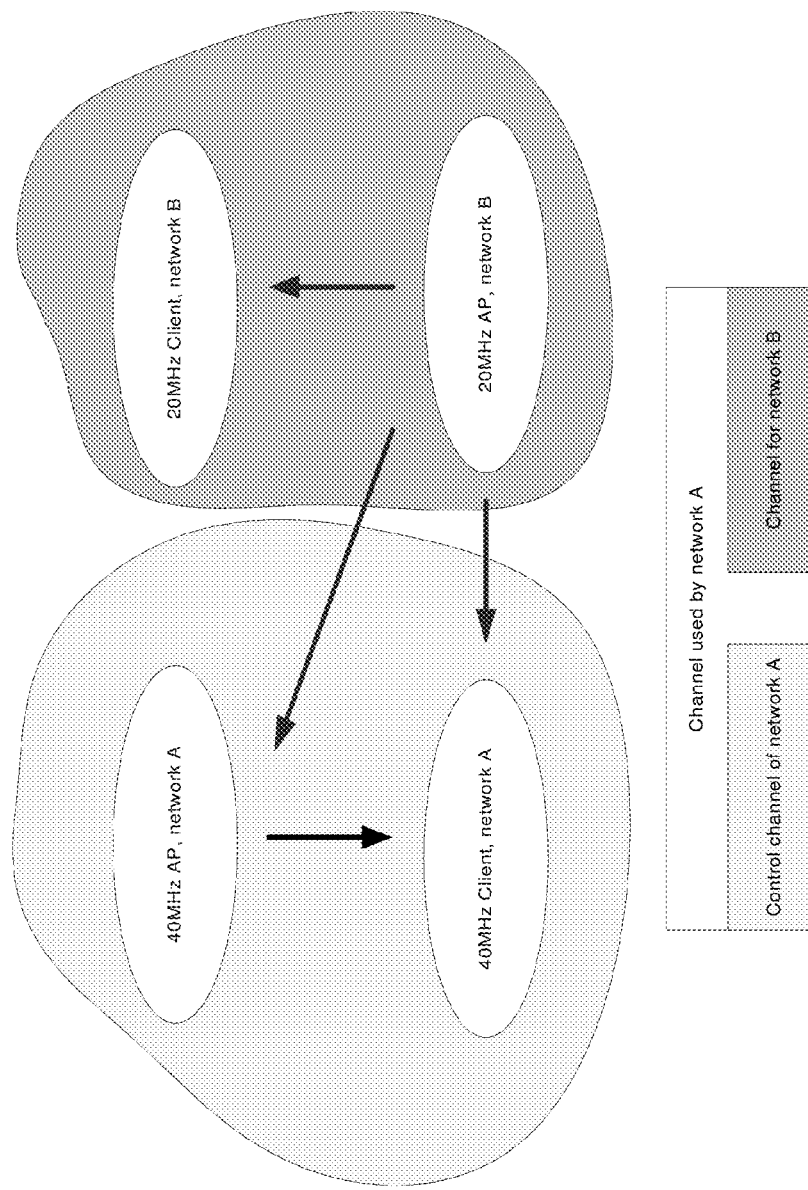
FIG. 5 depicts adjacent wireless networks.

More specifically, referring now to FIG. 5, a first wireless network (network A) comprises an access point A and a client station A. Access point A and client station A may comply with section 802.11n and communicate in a 40 MHz channel (channel A). Channel A comprises a 20 MHz primary channel (i.e., control channel) and a 20 MHz secondary channel (i.e., extension channel).

I.E.E.E. section 802.11n provides multiple channels for communication. Generally, channel 1 may be predetermined as the control channel. In that case, since adjacent channels are 5 MHz apart and since the control channel is 20 MHz wide, channel 5 may be predetermined as the extension channel. This is because the difference between channels 1 and 5 is 4 channels, and 4 channels x 5 MHz=20 MHz, which is the width of the control channel.

A second wireless network (network B) comprises an access point B and a client station B. Access point B and client station B may comply with one or more of I.E.E.E. sections 802.11 other than the section 802.11n. For example, access point B and client station B may comply with I.E.E.E. section 802.11a, 802.11b, or 802.11g. Access point B and client station B may communicate in a 20 MHz channel (channel B). Channel B may be one of channels 1, 6, and 11. For example, channel B may be channel 6.

At a given time, access point A and client station A may not be transmitting data. At the same time, access point B may be transmitting data to client station B on channel 6. Access point A may, however, have data to transmit to client station A while access point B is transmitting data to client station B. But access point A may transmit data to client station A via channel A at 40 MHz only if access point A determines that channel A is free.

Alternatively, access point A may have data to transmit to a client station C (not shown) in network A, where client station C may not comply with I.E.E.E. section 802.11n and may communicate only via a 20 MHz channel. In that case, access point A may transmit data to client station C via the control channel at 20 MHz if access point A determines that channel A is free.

Access point A may determine that channel A is free if both control and extension channels are free. Access point A may determine that channel A is busy if the control channel and/or the extension channel is busy. Access point A, however, may sense data in the extension channel due to the data transmitted by access point B. Access point A may mistake the data sensed in the extension channel as being transmitted by a client station like client station C and may not transmit data to client station C although the control channel is free.

Since access point A cannot determine whether the control channel is free when presence of data in the extension channel is sensed, access point A may erroneously determine that channel A is busy and may not transmit data to client station C. If access point A can determine that control channel is free although presence of data in the extension channel is sensed, access point A may transmit data to client station C.

One way to maximize utilization of channel A is to perform CS only in the control channel. In that case, access point A may not transmit data at all via channel A if any activity is sensed in the control channel. Collisions may occur, however, if access point A decides to transmit data via channel A based on the sole determination that the control channel is free. For example, if access point A determines that the control channel is free and decides to transmit data via channel A at 40 MHz while activity is present in the extension channel, the data transmitted may collide with any data that may be simultaneously present in the extension channel.

Collisions may be minimized and utilization of channel A may be maximized if the control channel can be used to transmit data when the control channel is free although the extension channel is busy. In other words, throughput of channel A may be increased if access point A can distinguish activity in the extension channel from the activity in the control channel. In that case, access point A can transmit data via channel A at 40 MHz if no activity is sensed in both control and extension channels, and access point A can transmit data via the control channel at 20 MHz if no activity is sensed in the control channel regardless of any activity present in the extension channel.

Figure 6:
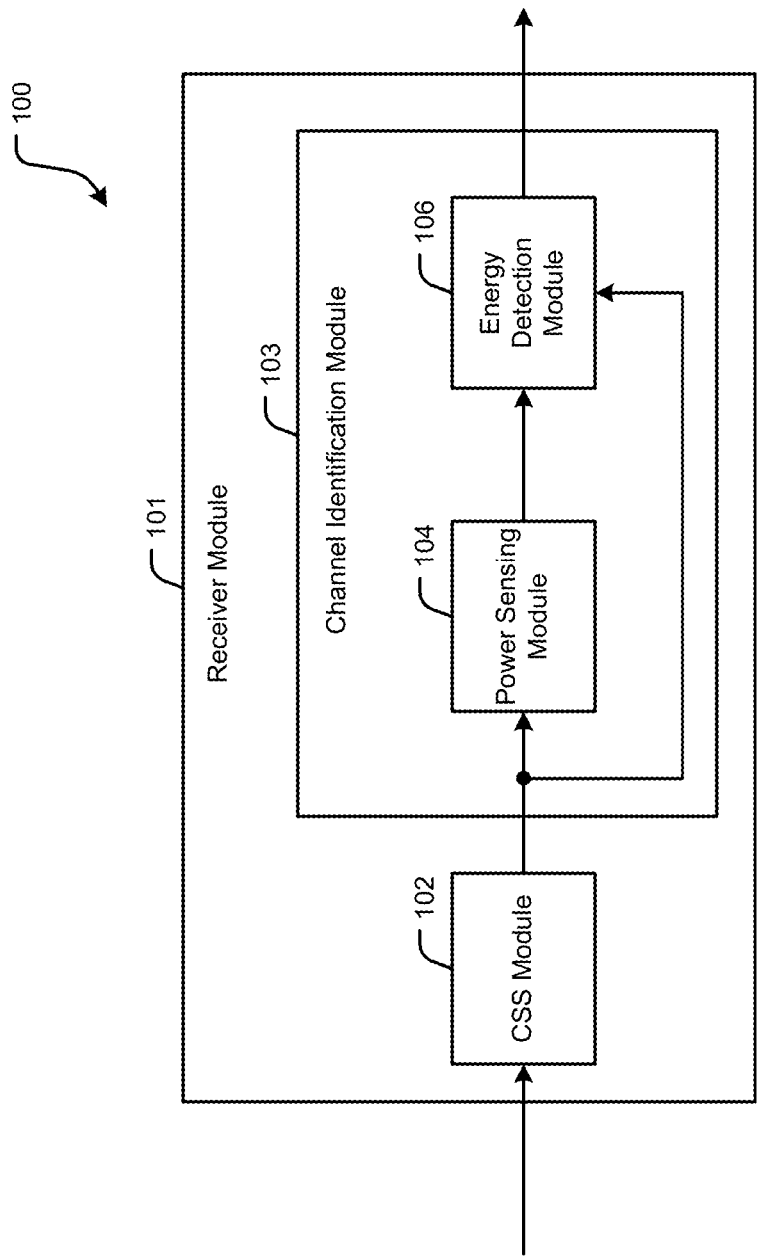
FIG. 6 is a functional block diagram of an exemplary system for detecting whether a radio frequency (RF) activity is present in a control channel when a receiver in a wireless network device receives RF signals according to the present disclosure.

Referring now to FIG. 6, a system 100 for generating CCA by distinguishing activity in control channel from activity in extension channel may be implemented in a 40 MHz receiver module 101 of an 802.11n-compliant wireless network device. A physical layer (PHY) module (not shown) of the wireless network device may comprise the receiver module 101 and may communicate the CCA to a media access controller (MAC) module in the wireless network device. The MAC module, in turn, may determine whether the wireless network device can transmit data in a 20 MHz control channel, the 40 MHz channel, or not at all depending on the value of CCA.

Throughout the present disclosure, the wireless network device may transmit data when CCA is low and may not transmit data when CCA is high. However, the system 100 may be configured so that similar operations may be performed when states of CCA are opposite. Additionally, as an example, the wireless network device may comprise antennas arranged in a 3×3 multiple-input multiple-output (MIMO) configuration (not shown). Consequently, the receiver module 101 may receive signals from three antennas. Alternatively, other MIMO configurations may be used.

The system 100 comprises a carrier sensing and synchronization (CSS) module 102 (also called an activity sensing module 102) and a channel identification module 103. The channel identification module 103 comprises a power sensing module 104 and an energy detection module 106. The CSS module 102 senses presence or absence of RF activity or RF carriers in control and/or extension channels of the 40 MHz channel and generates signals indicating whether a carrier is detected in the control and/or extension channels. Additionally, the CSS module 102 may perform synchronization based on preamble signals detected in the control and/or extension channels and may generate symbol timing data for the control and/or extension channels.

The channel identification module 103 identifies whether the RF activity is absent in the control channel although the RF activity is present in the extension channel. Specifically, the power sensing module 104 determines whether a carrier is present in the control and/or extension channels by analyzing signals generated by the CSS module 102. Additionally, the energy detection module 106 determines RF energy levels of the signals sensed in the control and/or extension channels based on the signals generated by the CSS module 102 and the power sensing module 104.

The energy detection module 106 confirms whether the signals sensed by the CSS module 102 are present only in the extension channel and not in the control channel or only in the control channel and not in the extension channel. Alternatively, the energy detection module 106 confirms whether the signals are present or absent in both control and extension channels.

The system 100 generates CCA based on the results generated by the energy detection channel 106. Based on the CCA, the wireless network device determines whether to transmit data via the 40 MHz channel at 40 MHz or via the control channel at 20 MHz. Specifically, the wireless network device transmits data via the 40 MHz channel at 40 MHz when the CCA indicates that both control and extension channels are free. Additionally, the wireless network device transmits data via the control channel at 20 MHz when the CCA indicates that the control channel is free although the extension channel is busy.

Figure 7:
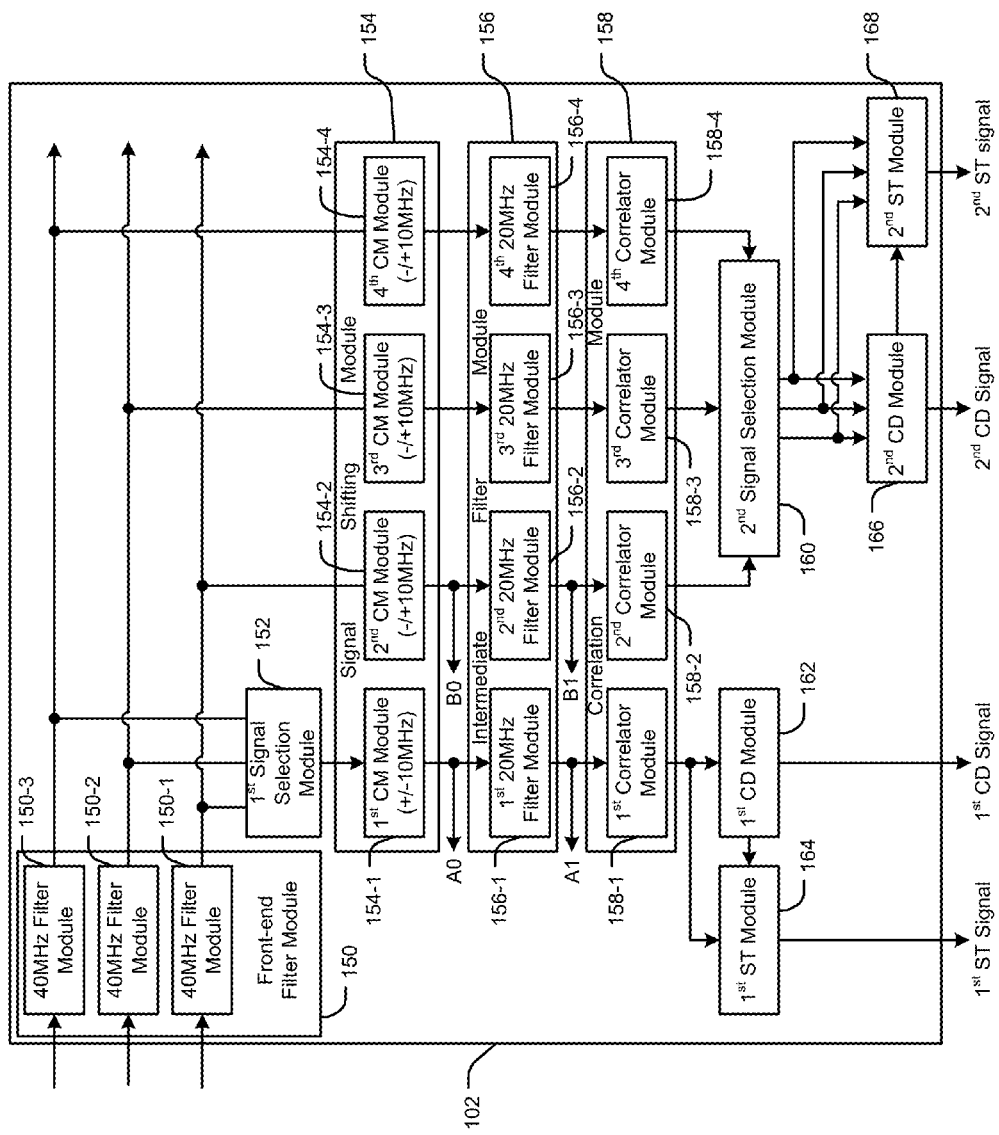
FIG. 7 is a functional block diagram of an exemplary carrier sensing and synchronization (CSS) module used in the receiver of FIG. 6 according to the present disclosure.

Referring now to FIG. 7, the CSS module 102 comprises a front-end filter module 150, a first signal-selection module 152, a signal-shifting module 154, an intermediate filter module 156, a correlation module 158, and a second signal-selection module 160. Additionally, the CSS module 102 comprises a first carrier detect (CD) module 162, a first symbol timing (ST) module 164, a second CD module 166, and a second ST module 168.

The front-end filter module 150 filters signals received by three antennas of the wireless network device and generates filtered signals. The signal-selection module 152 selects the strongest signal from the filtered signals. The signal-shifting module 154 shifts the filtered signals to separate signals in the extension channel from signals in the control channel and generates shifted signals. The intermediate filter module 156 filters the shifted signals and generates filtered shifted signals.

The correlation module 158 auto-correlates the filtered shifted signals with a predetermined delay and generates correlation values for the signals in the extension and control channels. Based on the correlation values, the second signal-selection module 160 ignores the weakest of the three signals and selects the strongest of the three signals in the control channel.

The first and second CD modules 162, 166 determine if a carrier is present in the extension and/or control channels and accordingly generate first and/or second carrier detect (CD) signals, respectively. If a carrier signal is detected in the extension and/or control channel, the first and second ST modules 164, 168 perform symbol timing and generate first and/or second symbol timing (ST) signals, respectively.

More specifically, the front-end filter module 150 comprises three 40 MHz filter modules (150-1, 150-2, and 150-3) that filter signals sensed by the three antennas in a 40 MHz channel and that generate filtered signals. Specifically, each of the 40 MHz filter modules 150-1, 150-2, and 150-3 filters out signals having frequencies outside the 40 MHz frequency band of the 40 MHz channel and passes signals having frequencies in the 40 MHz frequency band of the 40 MHz channel. Accordingly, the 40 MHz filter modules 150-1, 150-2, and 150-3 may be called adjacent channel interference rejection low-pass filters (ACRLPFs) or ACI filter modules. The 40 MHz filter modules 150-1, 150-2, and 150-3 may comprise 20-tap filters.

The first signal-selection module 152 selects the strongest of the filtered signals, which is processed to determine whether a signal is present in the extension channel. Additionally, the filtered signals from all the receive antennas are processed to determine whether the signal is present in the control channel. To minimize hardware cost, the filtered signals other than the strongest filtered signal are not processed to determine whether the signal is present in the extension channel.

The signal-shifting module 154 comprises four complex multiplier (CM) modules. A first CM module 154-1 shifts the strongest filtered signal by 10 MHz in a first direction (e.g., by +10 MHz) and generates a first shifted signal A0 that represents a signal in the extension channel. The first shifted signal A0 may also be called a first control signal. On the other hand, second, third, and fourth CM modules 154-2, 154-3, 154-4 shift the filtered signals by 10 MHz in a second direction that is opposite of the first direction (i.e., by −10 MHz).

Since the control and extension channels are 20 MHz wide, shifting signals by 10 MHz in the first and second directions effectively centers the signals in the extension and control channels, respectively. For example, shifting the signal by +10 MHz centers a lower half (i.e., −20 MHz to 0 MHz portion) of the 40 MHz channel, which is the extension channel. Additionally, shifting the signal by −10 MHz centers an upper half (i.e., +20 MHz to 0 MHz portion) of the 40 MHz channel, which is the control channel.

Thus, by shifting the strongest filtered signal in the first direction, the first CM module 154-1 separates the signal in the extension channel from the signal in the control channel. In other words, the first CM module 154-1 filters out the signal in the control channel from the strongest filtered signal.

Additionally, by shifting the filtered signals in the second direction, the second, third, and fourth CM modules 154-2, 154-3, 154-4 separate the signals in the control channel from the signals in the extension channel. In other words, the second, third, and fourth CM modules 154-2, 154-3, 154-4 filter out signals in the extension channel from the filtered signals.

Specifically, the second CM module 154-2 shifts the strongest filtered signal by 10 MHz in the second direction and generates a second shifted signal B0 that represents a signal in the control channel. The second shifted signal B0 may also be called a second control signal. Additionally, the third and fourth CM modules 154-3, 154-4 shift other filtered signals and generate third and fourth shifted signals, respectively.

The intermediate filter module 156 comprises four 20 MHz ACRLPF filter modules. The four 20 MHz ACRLPF filter modules, which may be called intra-channel filter modules, may comprise 20-tap filters that filter outputs of the four CM modules. Specifically, a first 20 MHz filter module 156-1 filters the first shifted signal A0 and generates a first filtered shifted signal A1. The first filtered shifted signal A1 may also be called a third control signal.

Similarly, a second 20 MHz filter module 156-2 filters the second shifted signal B0 and generates a second filtered shifted signal B1. The second filtered shifted signal B1 may also be called a fourth control signal. Additionally, the third and fourth 20 MHz filter modules 156-3, 156-4 filter outputs of third and fourth CM modules 154-3, 154-4 and generate third and fourth shifted filtered signals, respectively.

The correlation module 158 comprises four correlator modules that auto-correlate outputs of the four 20 MHz filter modules with a known delay. The delay may be at least 0.8 μs or a multiple of 0.8 μs. Specifically, a correlator module 158-1 correlates the first filtered shifted signal A1 and generates a correlation value for the extension channel. Similarly, a correlator module 158-2 correlates the second filtered shifted signal B1 and generates a correlation value for the control channel. Additionally, the third and fourth correlator modules 158-3, 158-4 correlate outputs of the third and fourth 20 MHz filter modules 156-3, 156-4 and generate two more correlation values for the control channel.

The correlation values indicate relative signal-strengths of the signals in each channel. All the signals in the control channel may not have high relative signal strengths. Accordingly, the second signal-selection module 160 selects and combines the strongest of the three signals in the control channel. Systems and methods for correlating and selecting signals based on signal strength are disclosed in U.S. patent application Ser. No. 11/642, 442 filed on Dec. 20, 2006, which is hereby incorporated by reference in its entirety.

Based on the correlation value generated by the first correlator module 158-1, the first CD module 162 determines whether a carrier is detected in the extension channel. The first CD module 162 generates a first CD signal if a carrier is present in the extension channel. In that case, the first ST module 164 performs symbol timing. If the symbol timing indicates a beginning of a data packet, the first ST module 164 generates a first ST signal for the extension channel.

Based on the relative signal strength of the signal selected by the second signal-selection module 160, the second CD module 166 determines whether a carrier is detected in the control channel. The second CD module 166 generates a second CD signal if a carrier is present in the control channel. In that case, the second ST module 168 performs symbol timing. If the symbol timing indicates a beginning of a data packet, the second ST module 168 generates a second ST signal for the control channel.

Depending on whether a carrier is detected in the extension and/or the control channel, the CSS module 102 may generate CCA. For example, if a carrier is not detected in both extension and control channels, the CCS module 102 may set CCA to a low value. When CCA is low, the wireless network device may transmit data via the 40 MHz channel if a carrier is not detected in both extension and control channels.

Alternatively, if the carrier is not detected in the control channel but is detected in the extension channel, the wireless network device may transmit data via the 20 MHz control channel if the carrier is not detected in the control channel but is detected in the extension channel.

On the other hand, if a carrier is detected in both extension and control channels, the CCS module 102 may set CCA to a high value. A high CCA indicates that another device is transmitting data in the 40 MHz channel. In that case, the wireless network device may not transmit data at all.

Occasionally, when the control channel is free, the signal in the extension channel may be strong. Consequently, the signal from the extension channel may leak into the control channel due to imperfections in the 20 MHz filter modules in the intermediate filter module 156. In that case, the second CD module 166 may erroneously detect a carrier in the control channel, and the second ST module 168 may erroneously detect a beginning of a packet although no data is being transmitted via the control channel. Consequently, CCA may be incorrectly set to a high value, and the wireless network device may not transmit data at all.

Figure 8:
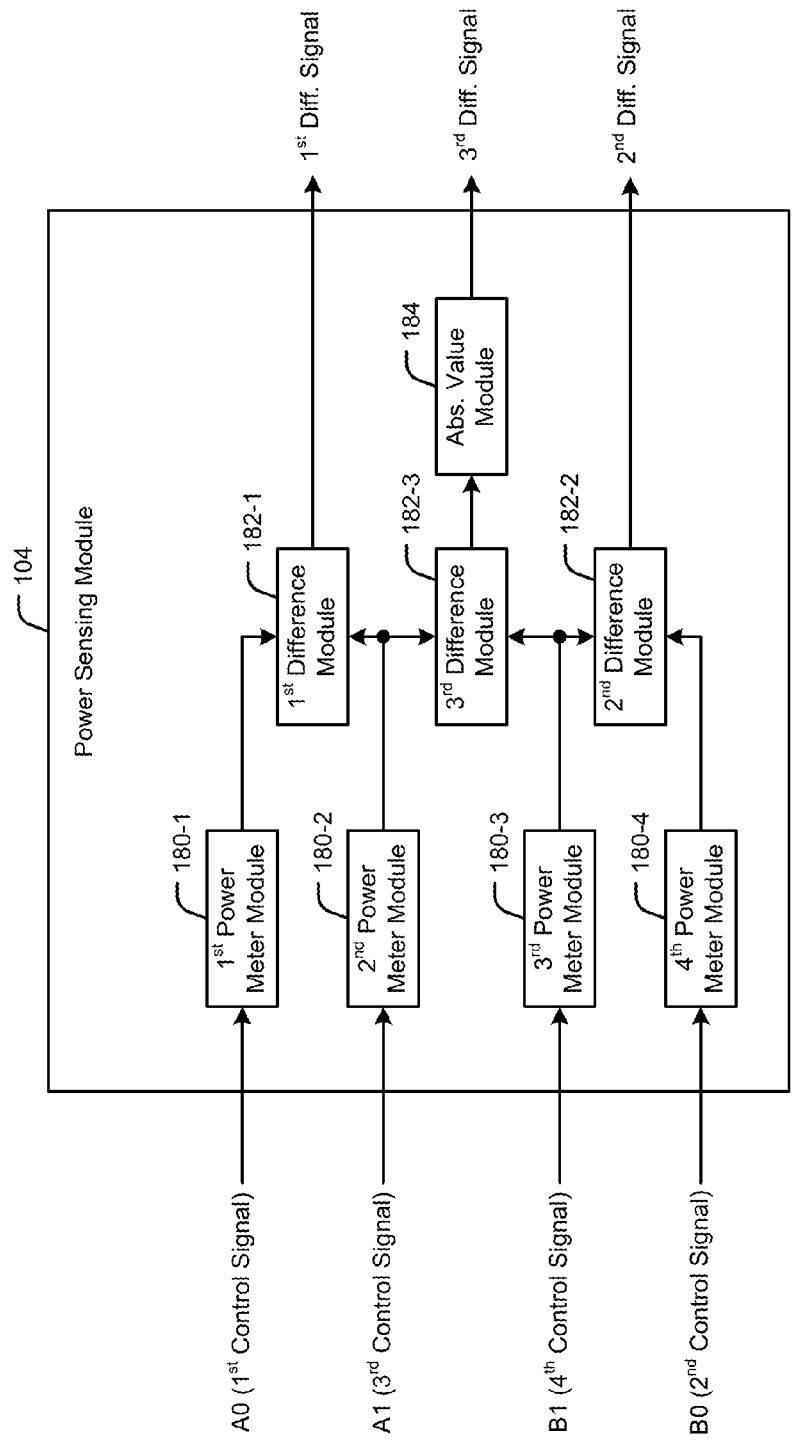
FIG. 8 is a functional block diagram of an exemplary power sensing module used in the receiver of FIG. 6 according to the present disclosure.

Referring now to FIG. 8, the power sensing module 104 uses the signals A0, A1, B0, and B1 generated by the CSS module 102 to determine whether a signal is present in the control channel and/or the extension channel so that the CCA will not be incorrect. The power sensing module 104 comprises four power meter (PM) modules, three difference modules, and an absolute value module.

First and second PM modules 180-1, 180-2 measure powers of signals A0 and A1, respectively. A first difference module 182-1 measures a difference in the powers and generates a first difference signal. If the difference is low, the power sensing module 104 determines that a signal is present in the extension channel. That is, the power sensing module 104 determines that another device is transmitting data in the 20 MHz bandwidth of the extension channel. If, however, the difference is high, the power sensing module 104 determines that a signal is absent in the extension channel. In either case, the wireless network device may transmit data via the control channel if no signal is present in the control channel.

Third and fourth PM modules 180-3, 180-4 measure powers of signals B1 and B0, respectively. A second difference module 182-2 measures a difference in the powers and generates a second difference signal. If the difference is low, the power sensing module 104 determines that a signal is present in the control channel. That is, another device is transmitting data in the MHz bandwidth of the control channel. In that case, CCA is set to a high value, and the wireless network device may not transmit at all.

If, however, the difference is high, the power sensing module 104 determines that a signal is absent in the control channel. In that case, the wireless network device may transmit data via the 20 MHz control channel if a signal is present in the extension channel or via the 40 MHz channel if the signal is absent in the extension channel.

A third difference module 182-3 measures a difference in powers of signals A1 and B1. An absolute value module 184 calculates an absolute value of the difference and generates a third difference signal. If the absolute value is low, the power sensing module 104 determines that a signal is present in both control and extension channels. That is, another device capable of communicating at 40 MHz is transmitting data in the 40 MHz channel. In that case, CCA is set to a high value, and the wireless network device may not transmit data at all.

If, however, the absolute value is high, the power sensing module 104 determines that a signal is absent in either control or extension channels, i.e., the signal is present in only one of the sub-channels. The CCA is set to a low value, and the wireless network device may transmit data via the MHz control channel if the activity is detected in the extension channel.

Figure 9:
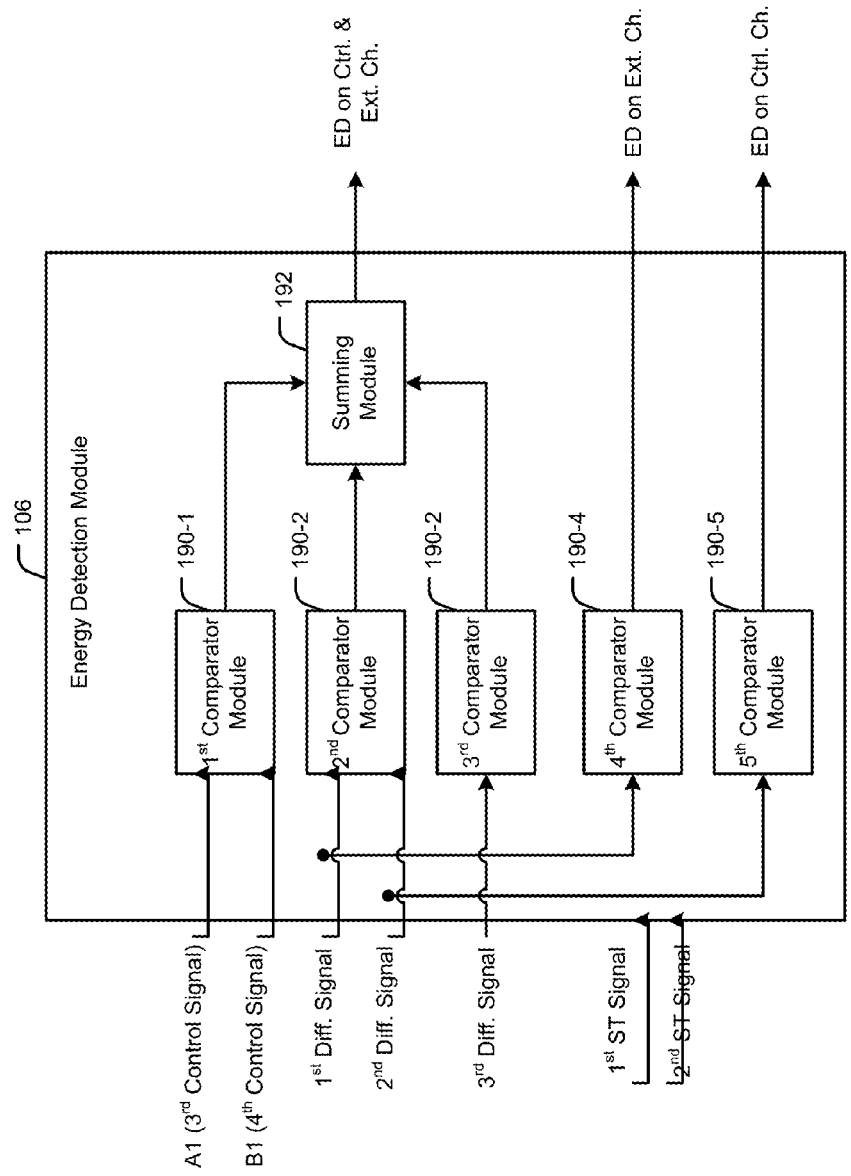
FIG. 9 is a functional block diagram of an exemplary energy detection module used in the receiver of FIG. 6 according to the present disclosure.

Referring now to FIG. 9, the energy detection module 106 increases the accuracy with which the wireless network device may decide whether to transmit data and on which channel to transmit that data. The energy detection module 106 comprises five comparator modules (190-1, . . . , 190-5), and a summing module 192. The energy detection module 106 determines whether RF energy is present in the control and/or extension channel by analyzing signals generated by the CSS module 102 and the power sensing module 104.

The PM modules 180-1, 180-2, 180-3, 180-4 include automatic gain control (AGC) modules, low-pass filter modules, etc. Consequently, signals generated by the power sensing module 104 take time to stabilize (i.e., to settle to stable values). Therefore, first and/or second ST signal generated by the first and/or second ST module 164, 168 is used to clock the energy detection module 106.

The energy detection module 106 performs energy detection only after the first and/or second ST module 164, 168 has detected a beginning of a valid data packet in the extension and/or control channel, respectively. While the energy detection module 106 waits until the first and/or second ST module 164, 168 generates first and/or ST signal, the signals generated by the power sensing module 104 stabilize.

After receiving first and/or second ST signal, the energy detection module 106 initially presumes that the energy levels in both control and extension channels are high. The energy detection module 106 presumes that another device is transmitting data in the 40 MHz band of the 40 MHz channel. The energy detection module 106 sets CCA to a high value. Thus, the wireless network device may not transmit data until the energy detection module 106 determines otherwise.

Thereafter, a first comparator module 190-1 determines if magnitude of signal A1 is greater than a first predetermined threshold called Threshold1, and if magnitude of signal B1 is greater than the Threshold1. The comparator module 190-1 generates a signal that is in a high (i.e., true) state if the results of both comparisons are true.

Additionally, a second comparator module 190-2 performs two comparisons: In a first comparison, the second comparator module 190-2 determines if magnitude of the first difference signal generated for the extension channel is less than a second predetermined threshold called Threshold2 (i.e., an extension-channel threshold). In a second comparison, the second comparator module 190-2 determines if magnitude of the second difference signal generated for the control channel is less than a third predetermined threshold called Threshold3 (i.e., a control-channel threshold). The second comparator module 190-2 generates a signal that is in a high (i.e., true) state if the results of both the first and second comparisons are true.

Finally, a third comparator module 190-3 determines if the absolute value of the third difference signal is less than the Threshold3 and generates a signal that is in a high (i.e., true) state if the result of the comparison is true. The summing module 192 sums (i.e., performs a logical OR operation on) the signals generated by the first, second, and third comparator modules 190-1, 190-2, 190-3.

If the sum is a high value (i.e., if the result of the OR operation is true), the energy detection module 106 determines that energy levels in both control and extension channels are high. The energy detection module 106 determines that another device is transmitting data in the 40 MHz band of the 40 MHz channel. The energy detection module 106 does not change the value of CCA, and the wireless network device may not transmit data at all.

If, however, the sum is a low value (i.e., if the result of the OR operation is false), the energy detection module 106 determines whether energy is present only in the control channel or only in the extension channel but not in both control and extension channels. Specifically, a fourth comparator module 190-4 determines if magnitude of the first difference signal is less than Threshold2. If true, the energy detection module 106 determines that energy is present in the extension channel and not in the control channel. The wireless network device may transmit data in the 20 MHz control channel.

On the other hand, if a fifth comparator module 190-5 determines that magnitude of the second difference signal is less than the Threshold3, the energy detection module determines that energy is present in the control channel and not in the extension channel. The wireless network device may not transmit data in either the 20 MHz control channel or the 40 MHz channel.

Figure 10A:
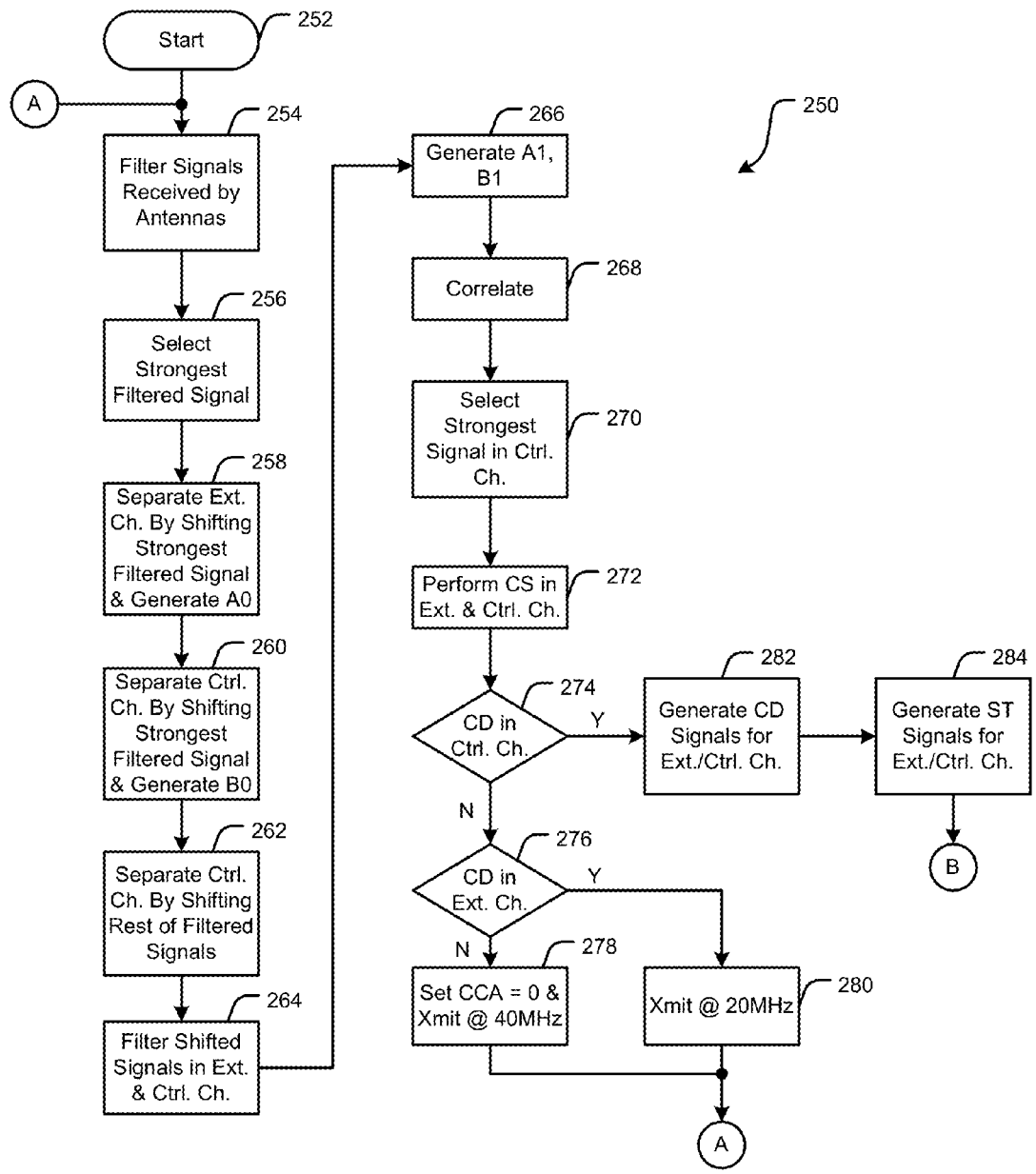
FIGS. 10A-10C depict flowcharts of an exemplary method for detecting whether a radio frequency (RF) activity is present in a control channel when a receiver in a wireless network device receives RF signals.
Figure 10B:
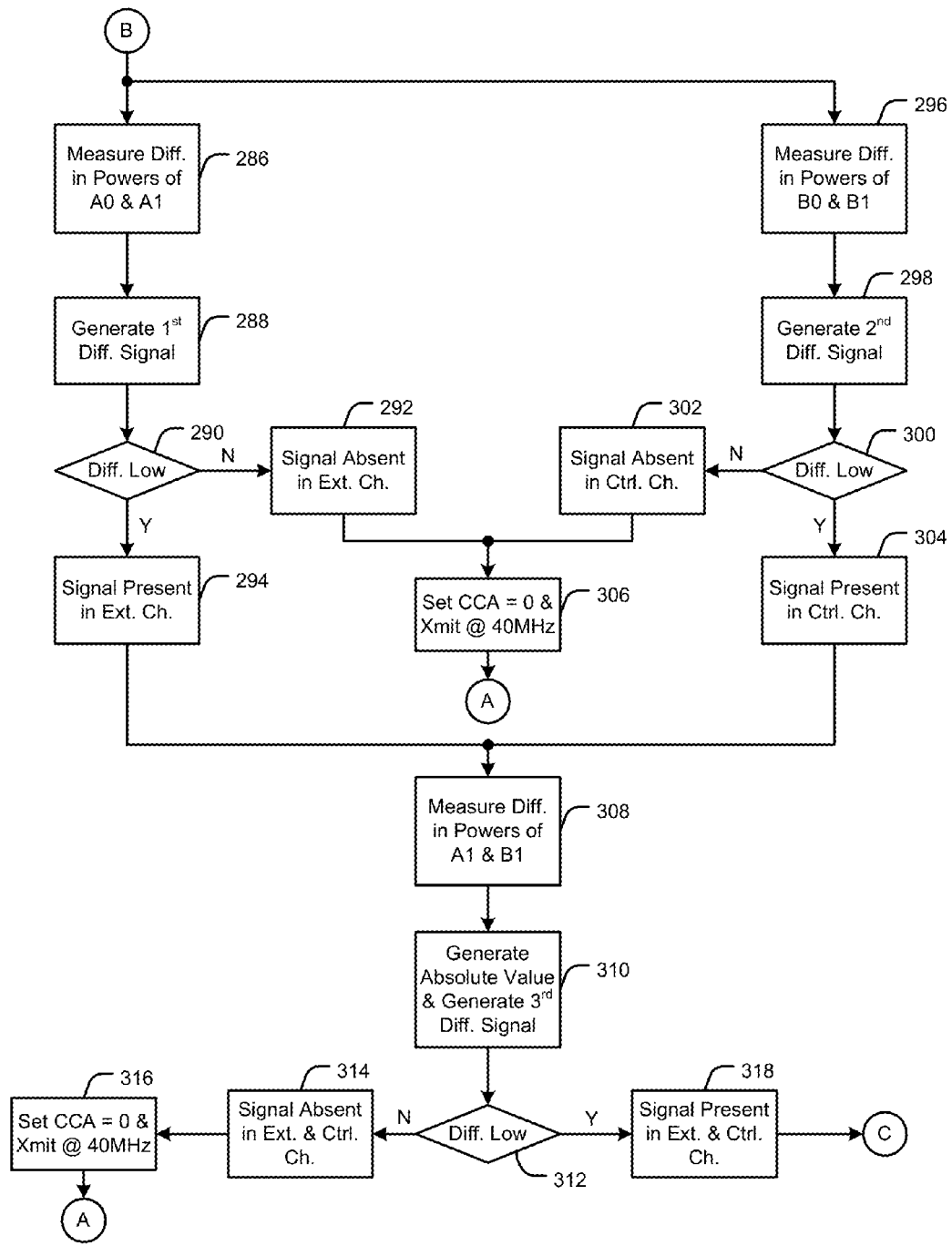
Figure 10C:
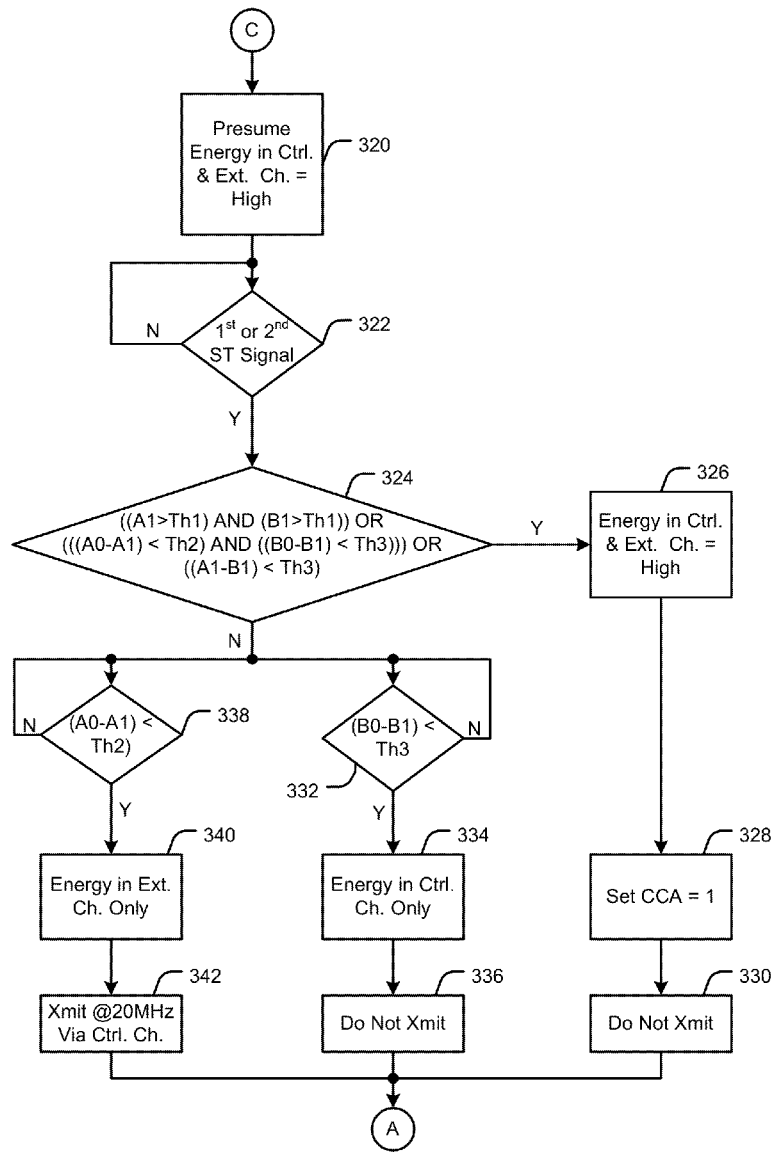

Referring now to FIGS. 10A-10C, a method 250 for generating CCA by distinguishing RF activity in control channel from RF activity in extension channel begins at step 252. In step 254, a front-end filter module 150 filters signals received by three antennas of an 802.11n-compliant wireless network device and generates filtered signals. In step 256, a first signal-selection module 152 selects the strongest of the filtered signals.

In step 258, a first complex multiplier (CM) module 154-1 shifts the strongest filtered signal by +10 MHz, separates signals in an extension channel from signals in a control channel, and generates a shifted signal A0 for the extension channel. In step 260, a second CM module 154-2 shifts the strongest filtered signal by −10 MHz, separates signals in the control channel from signals in the extension channel, and generates a shifted signal B0. Similarly, in step 262, third and fourth CM modules 154-3, 154-4 shift the remaining filtered signals by −10 MHz and separate signals in the control channel from signals in the extension channel.

An intermediate filter module 156 filters the shifted signals in the extension and control channels in step 264. Specifically, in step 266, a first 20 MHz filter module filters the signal A0 and generates a signal A1, and a second 20 MHz filter module filters the signal B0 and generates a signal B1. A correlation module 158 auto-correlates the signals generated by the intermediate filter module 156 with a known delay in step 268.

A second signal-selection module 160 selects the strongest of the signals in the control channel in step 270. In step 272, first and second carrier detection (CD) modules 162, 166 perform carrier sensing in the extension and control channels and generate first and/or second CD signals if a carrier is detected in the respective channels.

A CSS module 102 determines in step 274 if a carrier is detected in the control channel. If a carrier is not detected in the control channel, the CSS module 102 determines in step 276 if a carrier is detected in the extension channel. If a carrier is not detected in both extension and control channels, the CSS module 102 sets CCA to low (i.e., a binary zero) in step 278 so that the wireless network device may transmit data at 40 MHz. Alternatively, if a carrier is not detected in the control channel, then the wireless network device may transmit data at 20 MHz via the control channel in step 280. At the end of steps 278 and/or 280, the method 250 returns to step 254.

If, however, a carrier is detected in the control channel in step 274, then first and/or second CD modules 162, 166 generate first and/or second CD signals in step 282. Additionally, first and/or second symbol timing (ST) module 164, 168 generate a first and/or second ST signals in step 284.

A first difference module 182-1 measures a difference in powers of signals A0 and A1 in step 286 and generates a first difference signal in step 288. A power sensing module 104 determines in step 290 if the difference is low. If the difference is not low, the power sensing module 104 determines in step 292 that a signal is absent in the extension channel. If, however, the difference is low, the power sensing module 104 determines in step 294 that a signal is present in the extension channel.

Additionally, a second difference module 182-2 measures a difference in powers of signals B0 and B1 in step 296 and generates a second difference signal in step 298. The power sensing module 104 determines in step 300 if the difference is low. If the difference is not low, the power sensing module 104 determines in step 302 that a signal is absent in the control channel. If, however, the difference is low, the power sensing module 104 determines in step 304 that a signal is present in the control channel.

If the power sensing module 104 determines that a signal is absent in both control and extension channels, then in step 306, the power sensing module 104 sets the CCA to low, the wireless network device may transmit data at 40 MHz, and the method 250 returns to step 254. If, however, the power sensing module 104 determines that a signal is present in both control and extension channels, then a third difference module 182-3 measures a difference in powers of signals A1 and B1 in step 308. The third difference module 182-3 generates an absolute value of the difference and a third difference signal in step 310.

The power sensing module 104 determines in step 312 if the absolute value of the difference is low. If the absolute value of the difference is not low, the power sensing module 104 determines in step 314 that a signal is absent in both control and extension channels. In step 316, the power sensing module 104 sets the CCA to low, the wireless network device may transmit data at 40 MHz, and the method 250 returns to step 254. If, however, the absolute value of difference is low, then the power sensing module 104 determines in step 318 that a signal is present in both control and extension channels.

An energy detection module 106 initially presumes that RF energy level is high in both control and extension channels (i.e., CCA=1 or high) in step 320. The energy detection module 106 determines if first and/or second ST signals are received in step 322 and waits until at least one of the first and/or second ST signals is received. When at least one of the first and/or second ST signals is received, the energy detection module 106 performs a logical check as shown in box 324 in FIG. 10C.

If the result of the logical check is true, the energy detection module 106 confirms in step 326 that the energy level in control and extensions channels is in fact high. The energy detection module 106 keeps the CCA unchanged (i.e., set to 1 or high) in step 328. The wireless network device correctly decides not to transmit data at all in step 330, and the method 250 returns to step 254.

If, however, the result of the logical check is false, the energy detection module 106 determines in step 332 if the difference between B0 and B1 is less than Threshold3. If true, the energy detection module 106 confirms in step 334 that energy is present only in the control channel. The wireless network device may correctly decide not to transmit data at all in step 336, and the method 250 returns to step 254.

If the result of step 332 is false, the energy detection module 106 determines in step 338 if the difference between A0 and A1 is less than Threshold2. If true, the energy detection module 106 confirms in step 340 that energy is present only in the extension channel. The wireless network device may correctly decide to transmit data at 20 MHz via the control channel in step 342, and the method 250 returns to step 254.

Figure 11B:
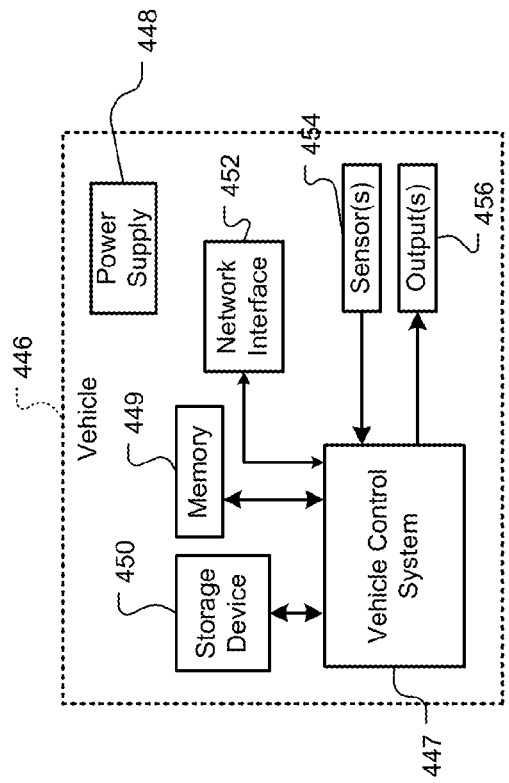
FIG. 11B is a functional block diagram of a vehicle control system.
Figure 11A:
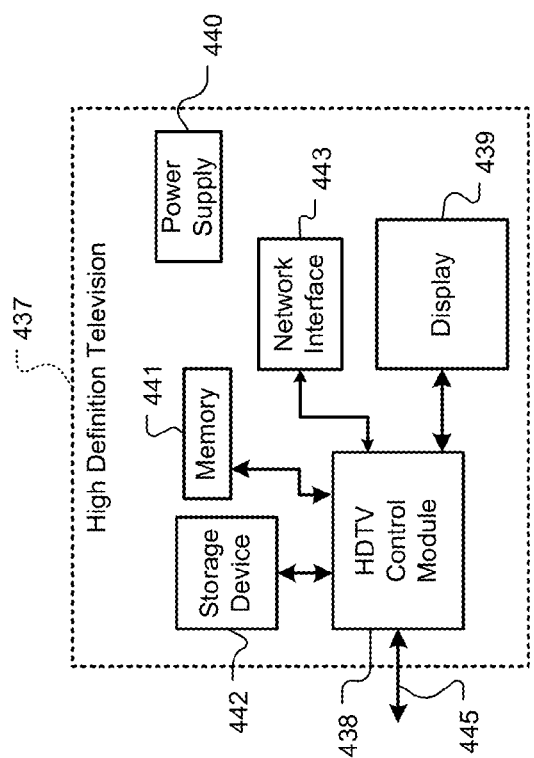
FIG. 11A is a functional block diagram of a high definition television.

Referring now to FIGS. 11A-11E, various exemplary implementations incorporating the teachings of the present disclosure are shown. Referring now to FIG. 11A, the teachings of the disclosure can be implemented in a network interface 443 of a high definition television (HDTV) 437. The HDTV 437 includes a HDTV control module 438, a display 439, a power supply 440, memory 441, a storage device 442, the network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 11B, the teachings of the disclosure may be implemented in a network interface 452 of a vehicle 446. The vehicle 446 may include a vehicle control system 447, a power supply 448, memory 449, a storage device 450, and the network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 11D:
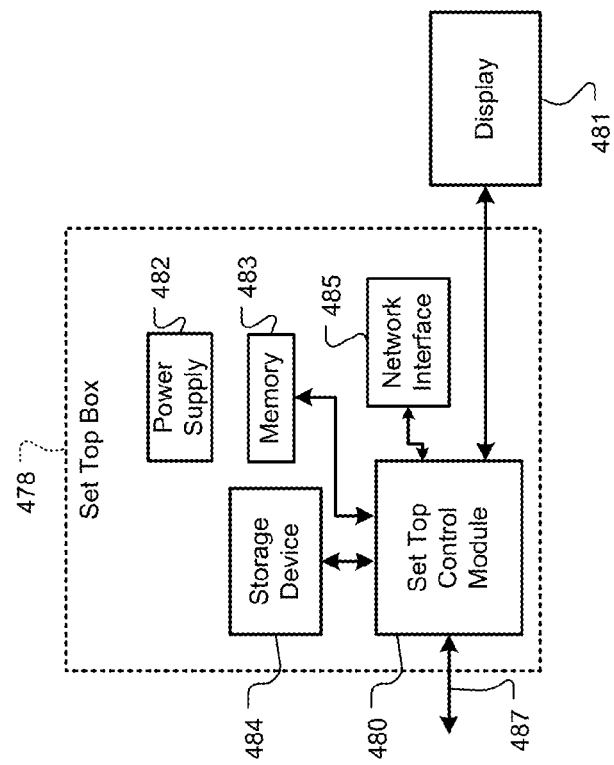
FIG. 11D is a functional block diagram of a set top box.
Figure 11C:
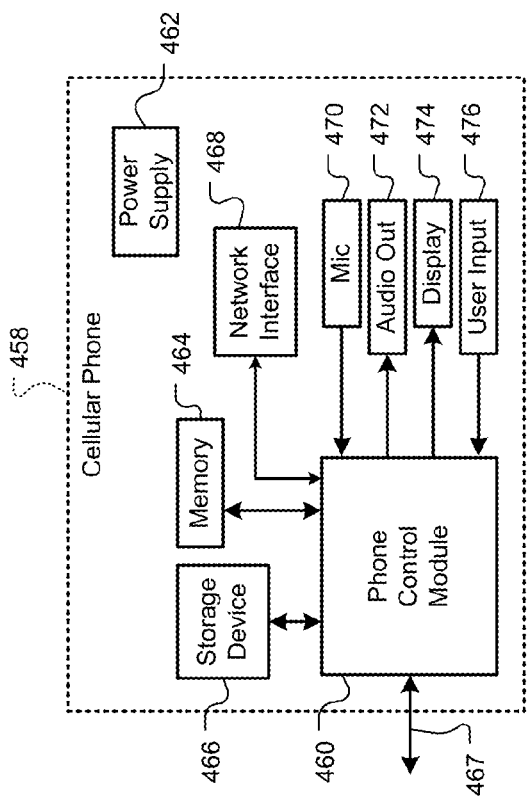
FIG. 11C is a functional block diagram of a cellular phone.

Referring now to FIG. 11C, the teachings of the disclosure can be implemented in a network interface 468 of a cellular phone 458. The cellular phone 458 includes a phone control module 460, a power supply 462, memory 464, a storage device 466, and a cellular network interface 467. The cellular phone 458 may include the network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 11D, the teachings of the disclosure can be implemented in a network interface 485 of a set top box 478. The set top box 478 includes a set top control module 480, a display 481, a power supply 482, memory 483, a storage device 484, and the network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 11E:
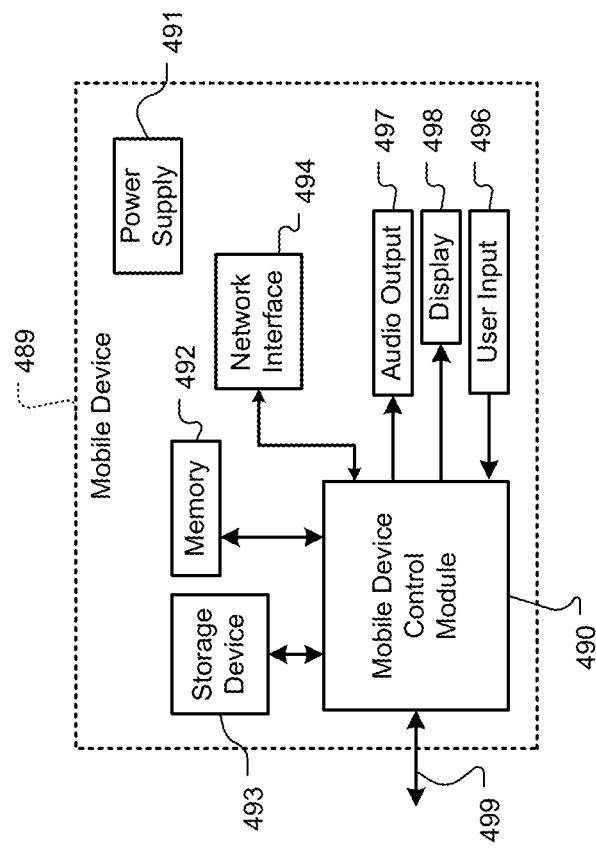
FIG. 11E is a functional block diagram of a mobile device.

Referring now to FIG. 11E, the teachings of the disclosure can be implemented in a network interface 494 of a mobile device 489. The mobile device 489 may include a mobile device control module 490, a power supply 491, memory 492, a storage device 493, the network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
 a plurality of filter modules configured to
  respectively communicate with a plurality of antennas, wherein the plurality of filter modules are arranged in parallel,
  filter signals received via the plurality antennas from channels other than a communication channel of a first wireless network, wherein the communication channel of the first network includes a first channel and a second channel, and
  generate a plurality of signals;
 a sensing module configured to
  sense, based on the plurality of signals, whether radio frequency signals from a second network are present in at least one of the first channel and the second channel, and
  generate a plurality of control signals indicating presence or absence of the radio frequency signals in at least one of the first channel and the second channel; and
 a channel identification module configured to determine, based on the plurality of control signals, that
  the communication channel is not available for communication in response to the radio frequency signals being present in the first channel,
  the communication channel is available for communication in response to the radio frequency signals being not present in both the first channel and the second channel, and
  the first channel is available for communication in response to the radio frequency signals being present only in the second channel.

2. The system of claim 1, further comprising a transmitter configured to:
 transmit data at 40 MHz via the communication channel in response to both the first channel and the second channel being available, and transmit data at 20 MHz via the first channel in response to the first channel being available regardless of whether the second channel is available.

3. The system of claim 1, further comprising:
a first signal-selection module configured to select one of the plurality of signals having a signal-strength greater than others of the plurality of signals;
a first multiplier module configured to (i) shift the selected one of the plurality of control signals in a first direction, (ii) filter out signals in the first channel, and (iii) generate a first control signal;
a second multiplier module configured to (i) shift the selected one of the plurality of control signals in a second direction, (ii) filter out signals in the second channel, and (iii) generate a second control signal, wherein the second direction is opposite of the first direction; and
one or more additional multiplier modules configured to (i) shift the control signals other than the selected one of the plurality of control signals in the second direction, and (ii) generate one or more additional signals.

4. The system of claim 3, further comprising:
a first filter configured to (i) filter the first control signal, and (ii) generate a third control signal;
a second filter configured to (i) filter the second control signal, and (ii) generate a fourth control signal; and
one or more additional filters configured to (i) filter the one or more additional signals, and (ii) generate one or more filtered signals.

5. The system of claim 4, further comprising a power sensing module configured to:
sense a difference in powers of the first control signal and the third control signal and generate a first difference signal;
sense a difference in powers of the second control signal and the fourth control signal and generate a second difference signal;
sense a difference in powers of the third control signal and the fourth control signal, generate an absolute value of the difference in powers of the third control signal and the fourth control signal, and generate a third difference signal; and
generate a first clear channel assessment based on the first, second, and third difference signals, wherein the first clear channel assessment indicates that the radio frequency signals are
  present in the second channel when the difference in powers of the first control signal and the third control signal is low;
  not present in the second channel when the difference in powers of the first control signal and the third control signal is high;
  present in the first channel when the difference in powers of the second control signal and the fourth control signal is low;
  not present in the first channel when the difference in powers of the second control signal and the fourth control signal is high;
  present in the first channel and the second channel when the absolute value is low; and
  not present in the first channel and the second channel when the absolute value is high.

6. The system of claim 5, further comprising a plurality of correlator modules, wherein:
one of the plurality of correlator modules is configured to (i) correlate the third control signal with a predetermined delay, and (ii) generate a first correlation value for the second channel; and
others of the plurality of correlator modules are configured to (i) correlate the fourth control signal and the one or more filtered signals with the predetermined delay, and (ii) generate a plurality of correlation values for the first channel.

7. The system of claim 6, further comprising:
a second signal selection module configured to select a signal in the first channel from the fourth control signal and the one or more filtered signals, wherein the signal has a highest of the plurality of correlation values;
a first carrier detect module configured to (i) detect a radio frequency carrier in the second channel based on the first correlation value and (ii) generate a first carrier detect signal;
a first symbol timing module configured to generate a first symbol timing signal in response to the first carrier detect signal;
a second carrier detect module configured to (i) detect a radio frequency carrier in the first channel based on a strength of the selected signal and (ii) generate a second carrier detect signal; and
a second symbol timing module configured to generate a second symbol timing signal in response to the second carrier detect signal.

8. The system of claim 7, further comprising an energy detection module configured to:
detect whether radio frequency energy is present in the first channel, the second channel, or both the first channel and the second channel, and
generate a second clear channel estimate based on the third control signal, the fourth control signal, the first difference signal, the second difference signal, and the third difference signal in response to receiving the first symbol timing signal or the second symbol timing signal.

9. The system of claim 8, wherein the second clear channel estimate indicates that the radio frequency energy is present in both the first channel and the second channel when at least one of the following is true:
magnitudes of the third control signal and the fourth control signal are greater than a first predetermined threshold;
magnitude of the first difference signal is less than a second predetermined threshold and magnitude of the second difference signal is less than a third predetermined threshold; and
magnitude of the third difference signal is less than the third predetermined threshold.

10. The system of claim 8, wherein the second clear channel estimate indicates that the radio frequency energy is present in the second channel and not present in the first channel when magnitude of the first difference signal is less than a first-channel threshold and when each of the following is false:
magnitudes of the third control signal and the fourth control signal are greater than a first predetermined threshold;
magnitude of the first difference signal is less than a second predetermined threshold and magnitude of the second difference signal is less than a third predetermined threshold; and
magnitude of the third difference signal is less than the third predetermined threshold.

11. The system of claim 8, wherein the second clear channel estimate indicates that the radio frequency energy is present in the first channel and not present in the second channel when magnitude of the second difference signal is less than a second-channel threshold and when each of the following is false:

magnitudes of the third control signal and the fourth control signal are greater than a first predetermined threshold;

magnitude of the first difference signal is less than a second predetermined threshold and magnitude of the second difference signal is less than a third predetermined threshold; and magnitude of the third difference signal is less than the third predetermined threshold.

12. A method, comprising:

filtering out, using a plurality of filter modules respectively communicating with a plurality of antennas, signals received via the plurality antennas from channels other than a communication channel of a first wireless network to generate a plurality of signals, wherein the plurality of filter modules are arranged in parallel, and wherein the communication channel of the first network includes a first channel and a second channel;

sensing, based on the plurality of signals, whether radio frequency signals from a second network are present in at least one of the first channel and the second channel;

generating a plurality of control signals indicating presence or absence of the radio frequency signals in at least one of the first channel and the second channel; and determining, based on the plurality of control signals, that
        the communication channel is not available for communication in response to the radio frequency signals being present in the first channel,
        the communication channel is available for communication in response to the radio frequency signals being not present in both the first channel and the second channel,
        the first channel is available for communication in response to the radio frequency signals being present only in the second channel.

13. The method of claim 12, further comprising:

transmitting data at 40 MHz via the communication channel in response to both the first channel and the second channel being available, and transmitting data at 20 MHz via the first channel in response to the first channel being available regardless of whether the second channel is available.

14. The method of claim 12, further comprising:

selecting one of the plurality of signals having a signal-strength greater than others of the plurality of signals;

generating a first control signal by (i) shifting the selected one of the plurality of control signals in a first direction, and (ii) filtering out signals in the first channel;

generating a second control signal by (i) shifting the selected one of the plurality of control signals in a second direction, and (ii) filtering out signals in the second channel, wherein the second direction is opposite of the first direction; and generating one or more additional signals by shifting the control signals other than the selected one of the plurality of control signals in the second direction.

15. The method of claim 14, further comprising:

generating a third control signal by filtering the first control signal;

generating a fourth control signal by filtering the second control signal; and generate one or more filtered signals by filtering the one or more additional signals.

16. The method of claim 15, further comprising:

generating a first difference signal by sensing a difference in powers of the first control signal and the third control signal;

generating a second difference signal by sensing a difference in powers of the second control signal and the fourth control signal;

generating a third difference signal by (i) sensing a difference in powers of the third control signal and the fourth control signal, and (ii) generating an absolute value of the difference in powers of the third control signal and the fourth control signal; and generating a first clear channel assessment based on the first, second, and third difference signals, wherein the first clear channel assessment indicates that the radio frequency signals are
        present in the second channel when the difference in powers of the first control signal and the third control signal is low;
        not present in the second channel when the difference in powers of the first control signal and the third control signal is high;
        present in the first channel when the difference in powers of the second control signal and the fourth control signal is low;
        not present in the first channel when the difference in powers of the second control signal and the fourth control signal is high;
        present in the first channel and the second channel when the absolute value is low; and
        not present in the first channel and the second channel when the absolute value is high.

17. The method of claim 16, further comprising:

generating a first correlation value for the second channel by correlating the third control signal with a predetermined delay; and generating a plurality of correlation values for the first channel by correlating the fourth control signal and the one or more filtered signals with the predetermined delay.

18. The method of claim 17, further comprising:

selecting a signal in the first channel from the fourth control signal and the one or more filtered signals, wherein the signal has a highest of the plurality of correlation values;

generating a first carrier detect signal by detecting a radio frequency carrier in the second channel based on the first correlation value;

generating a first symbol timing signal in response to the first carrier detect signal;

generating a second carrier detect signal by detecting a radio frequency carrier in the first channel based on a strength of the selected signal; and generating a second symbol timing signal in response to the second carrier detect signal.

19. The method of claim 18, further comprising:

detecting whether radio frequency energy is present in the first channel, the second channel, or both the first channel and the second channel; and generating a second clear channel estimate based on the third control signal, the fourth control signal, the first difference signal, the second difference signal, and the third difference signal in response to receiving the first symbol timing signal or the second symbol timing signal.

20. The method of claim 19, further comprising indicating using the second clear channel estimate that:
- the radio frequency energy is present in both the first channel and the second channel when at least one of the following is true:
  - magnitudes of the third control signal and the fourth control signal are greater than a first predetermined threshold,
  - magnitude of the first difference signal is less than a second predetermined threshold and magnitude of the second difference signal is less than a third predetermined threshold, and
  - magnitude of the third difference signal is less than the third predetermined threshold;
- the radio frequency energy is present in the second channel and not present in the first channel when magnitude of the first difference signal is less than a first-channel threshold and when each of the following is false:
  - magnitudes of the third control signal and the fourth control signal are greater than a first predetermined threshold,
  - magnitude of the first difference signal is less than a second predetermined threshold and magnitude of the second difference signal is less than a third predetermined threshold, and
  - magnitude of the third difference signal is less than the third predetermined threshold; or
- the radio frequency energy is present in the first channel and not present in the second channel when magnitude of the second difference signal is less than a second-channel threshold and when each of the following is false:
  - magnitudes of the third control signal and the fourth control signal are greater than a first predetermined threshold,
  - magnitude of the first difference signal is less than a second predetermined threshold and magnitude of the second difference signal is less than a third predetermined threshold, and
  - magnitude of the third difference signal is less than the third predetermined threshold.

* * * * *